United States Patent
Cat et al.

(10) Patent No.: US 11,049,095 B2
(45) Date of Patent: Jun. 29, 2021

(54) POINT OF SALE (POS) SYSTEMS AND METHODS WITH DYNAMIC KERNEL SELECTION

(71) Applicant: Square, Inc., San Francisco, CA (US)

(72) Inventors: Murat Cat, Thornhill (CA); Gokhan Aydeniz, Mississauga (CA); David Terra, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 16/231,030

(22) Filed: Dec. 21, 2018

(65) Prior Publication Data
US 2020/0202327 A1 Jun. 25, 2020

(51) Int. Cl.
| | | |
|---|---|---|
| G06Q 20/32 | (2012.01) | |
| G06Q 20/20 | (2012.01) | |
| G06Q 20/40 | (2012.01) | |

(52) U.S. Cl.
CPC ......... *G06Q 20/3278* (2013.01); *G06Q 20/20* (2013.01); *G06Q 20/409* (2013.01)

(58) Field of Classification Search
CPC .................................................. G06Q 20/3278
See application file for complete search history.

(56) References Cited

U.S. PATENT DOCUMENTS

| | | |
|---|---|---|
| 3,128,349 A | 4/1964 | Boesch et al. |
| 4,776,003 A | 10/1988 | Harris |

(Continued)

FOREIGN PATENT DOCUMENTS

| | | |
|---|---|---|
| AU | 2324402 A | 6/2002 |
| CA | 2 997 776 A1 | 3/2017 |

(Continued)

OTHER PUBLICATIONS

Examination Report, for European Patent Application No. 17739802. 1, dated Nov. 8, 2019.

(Continued)

*Primary Examiner* — Scott C Anderson
(74) *Attorney, Agent, or Firm* — Maynard Cooper & Gale, P.C.; Jon E. Holland, Esq.

(57) ABSTRACT

A payment reader can have one or more kernels capable of performing certain payment processing functions but not capable of performing certain, more processing-intensive payment processing functions. The payment reader may be designed to selectively assign processing tasks to application layer kernels located on a mobile device and/or a cloud-based device external to the payment reader, the mobile device having more or different processing resources than the payment reader. The selective assignment may be made dynamically based on the measurement of a condition of the reader or an occurrence of an event, such as a determination that the payment reader cannot process a transaction, that the payment reader does not have sufficient battery strength to process the transaction, or that there has been a tempering attempt at the payment reader. The payment reader also has a physical layer module, which module maintains its processing on the payment reader. By these means, the processing related to a payment transaction is conducted on a hybrid system, using resources both local to and remote from the payment reader.

18 Claims, 10 Drawing Sheets

(56) References Cited

U.S. PATENT DOCUMENTS

| | | |
|---|---|---|
| 4,860,336 A | 8/1989 | D'Avello et al. |
| 5,221,838 A | 6/1993 | Gutman et al. |
| 5,351,296 A | 9/1994 | Sullivan |
| 5,388,155 A | 2/1995 | Smith |
| 5,408,513 A | 4/1995 | Busch, Jr. et al. |
| 5,696,955 A | 12/1997 | Goddard et al. |
| 5,714,741 A | 2/1998 | Pieterse et al. |
| 5,729,591 A | 3/1998 | Bailey |
| 5,740,232 A | 4/1998 | Pailles et al. |
| 5,793,027 A | 8/1998 | Baik |
| 5,838,773 A | 11/1998 | Eisner et al. |
| 5,850,599 A | 12/1998 | Seiderman |
| 5,867,795 A | 2/1999 | Novis et al. |
| 5,940,510 A | 8/1999 | Curry et al. |
| 5,974,312 A | 10/1999 | Hayes, Jr. et al. |
| 6,010,067 A | 1/2000 | Elbaum |
| 6,065,679 A | 5/2000 | Levie et al. |
| 6,098,881 A | 8/2000 | Deland, Jr. et al. |
| 6,144,336 A | 11/2000 | Preston et al. |
| 6,230,319 B1 | 5/2001 | Britt, Jr. et al. |
| 6,234,389 B1 | 5/2001 | Valliani et al. |
| 6,278,779 B1 | 8/2001 | Bryant et al. |
| 6,332,172 B1 | 12/2001 | Iverson |
| 6,481,623 B1 | 11/2002 | Grant et al. |
| 6,609,655 B1 | 8/2003 | Harrell |
| 6,675,203 B1 | 1/2004 | Herrod et al. |
| 6,886,742 B2 | 5/2005 | Stoutenburg et al. |
| 6,990,683 B2 | 1/2006 | Itabashi |
| 7,003,316 B1 | 2/2006 | Elias et al. |
| 7,066,382 B2 | 6/2006 | Kaplan |
| 7,083,090 B2 | 8/2006 | Zuili |
| 7,163,148 B2 | 1/2007 | Durbin et al. |
| 7,210,627 B2 | 5/2007 | Morley et al. |
| 7,318,151 B1 | 1/2008 | Harris |
| 7,363,054 B2 | 4/2008 | Elias et al. |
| 7,403,907 B1 | 7/2008 | Gerken, III et al. |
| 7,424,732 B2 | 9/2008 | Matsumoto et al. |
| 7,433,452 B2 | 10/2008 | Taylor et al. |
| 7,472,394 B1 | 12/2008 | Meckenstock et al. |
| 7,478,065 B1 | 1/2009 | Ritter et al. |
| 7,591,425 B1 | 9/2009 | Zuili et al. |
| 7,673,799 B2 | 3/2010 | Hart et al. |
| 7,810,729 B2 | 10/2010 | Morley, Jr. |
| 7,896,248 B2 | 3/2011 | Morley, Jr. |
| 8,086,531 B2 | 12/2011 | Litster et al. |
| 8,126,734 B2 | 2/2012 | Dicks et al. |
| 8,180,971 B2 | 5/2012 | Scott et al. |
| 8,196,131 B1 | 6/2012 | von Behren et al. |
| 8,245,076 B2 | 8/2012 | Schindel, Jr. et al. |
| 8,265,553 B2 | 9/2012 | Cheon et al. |
| 8,284,061 B1 | 10/2012 | Dione |
| 8,335,921 B2 | 12/2012 | von Behren et al. |
| 8,336,762 B1 | 12/2012 | DiMattina et al. |
| 8,397,988 B1 | 3/2013 | Zuili |
| 8,534,555 B1 | 9/2013 | Sweet et al. |
| 8,650,439 B2 | 2/2014 | Rabeler |
| 8,910,868 B1 | 12/2014 | Wade et al. |
| 8,959,034 B2 | 2/2015 | Jiang et al. |
| 9,020,853 B2 | 4/2015 | Hoffman et al. |
| 9,092,766 B1 | 7/2015 | Bedier et al. |
| 9,134,994 B2 | 9/2015 | Patel et al. |
| 9,224,142 B2 | 12/2015 | Lamba et al. |
| 9,230,254 B1* | 1/2016 | Sharifi Mehr ..... G06Q 20/3567 |
| 9,286,494 B1 | 3/2016 | Lamfalusi et al. |
| 9,330,383 B1 | 5/2016 | Vadera |
| 9,342,823 B2 | 5/2016 | Casares et al. |
| 9,357,332 B2 | 5/2016 | Tang et al. |
| 9,547,861 B2 | 1/2017 | Itwaru |
| 9,613,350 B1 | 4/2017 | Vadera |
| 9,672,508 B2 | 6/2017 | Aabye et al. |
| 9,679,286 B2 | 6/2017 | Colnot et al. |
| 9,778,928 B1 | 10/2017 | Steshenko et al. |
| 9,785,930 B1 | 10/2017 | Terra et al. |
| 9,836,732 B1 | 12/2017 | Mocko et al. |
| 9,881,302 B1 | 1/2018 | White et al. |
| 9,916,567 B1 | 3/2018 | Baar et al. |
| 10,062,082 B2 | 8/2018 | Unser et al. |
| 10,083,437 B2 | 9/2018 | Vadera |
| 10,108,412 B2 | 10/2018 | Steshenko et al. |
| 10,163,107 B1 | 12/2018 | White et al. |
| 10,248,940 B1 | 4/2019 | Bota et al. |
| 10,684,848 B1 | 6/2020 | Steshenko et al. |
| 2002/0091633 A1 | 7/2002 | Proctor |
| 2002/0153414 A1 | 10/2002 | Stoutenburg et al. |
| 2003/0132293 A1 | 7/2003 | Fitch et al. |
| 2003/0135418 A1 | 7/2003 | Shekhar et al. |
| 2003/0142855 A1* | 7/2003 | Kuo ................ G06K 9/00154 382/119 |
| 2003/0154414 A1 | 8/2003 | von Mueller et al. |
| 2003/0183691 A1 | 10/2003 | Lahteenmaki et al. |
| 2004/0012875 A1 | 1/2004 | Wood |
| 2004/0041911 A1 | 3/2004 | Odagiri et al. |
| 2004/0049451 A1 | 3/2004 | Berardi et al. |
| 2004/0059682 A1 | 3/2004 | Hasumi et al. |
| 2004/0068656 A1 | 4/2004 | Lu |
| 2004/0104268 A1 | 6/2004 | Bailey |
| 2004/0138868 A1 | 7/2004 | Kuznetsov et al. |
| 2004/0167820 A1 | 8/2004 | Melick et al. |
| 2004/0204082 A1 | 10/2004 | Abeyta |
| 2004/0205745 A1 | 10/2004 | Piazza |
| 2004/0230488 A1 | 11/2004 | Beenau et al. |
| 2004/0236672 A1 | 11/2004 | Jung et al. |
| 2005/0091589 A1 | 4/2005 | Ramarao |
| 2005/0097015 A1 | 5/2005 | Wilkes et al. |
| 2005/0109841 A1 | 5/2005 | Ryan et al. |
| 2005/0136949 A1 | 6/2005 | Barnes, Jr. |
| 2005/0156026 A1 | 7/2005 | Ghosh et al. |
| 2005/0236480 A1 | 10/2005 | Vrotsos et al. |
| 2005/0240919 A1 | 10/2005 | Kim et al. |
| 2006/0032905 A1 | 2/2006 | Bear et al. |
| 2006/0049255 A1 | 3/2006 | von Mueller et al. |
| 2006/0059530 A1 | 3/2006 | Spielman et al. |
| 2006/0093149 A1 | 5/2006 | Zhu et al. |
| 2006/0219776 A1 | 10/2006 | Finn |
| 2006/0223580 A1 | 10/2006 | Antonio et al. |
| 2006/0255128 A1 | 11/2006 | Johnson et al. |
| 2006/0282382 A1 | 12/2006 | Balasubramanian et al. |
| 2007/0044099 A1 | 2/2007 | Rajput |
| 2007/0067833 A1 | 3/2007 | Colnot |
| 2007/0078957 A1 | 4/2007 | Ypyä et al. |
| 2007/0168265 A1 | 7/2007 | Rosenberger |
| 2007/0168300 A1 | 7/2007 | Quesselaire et al. |
| 2007/0194104 A1 | 8/2007 | Fukuda et al. |
| 2007/0198436 A1 | 8/2007 | Weiss |
| 2007/0241185 A1 | 10/2007 | Pang et al. |
| 2007/0257109 A1 | 11/2007 | Johansen, Jr. et al. |
| 2008/0091617 A1 | 4/2008 | Hazel et al. |
| 2008/0121687 A1 | 5/2008 | Buhot |
| 2008/0162312 A1 | 7/2008 | Sklovsky et al. |
| 2008/0162361 A1 | 7/2008 | Sklovsky et al. |
| 2008/0179388 A1 | 7/2008 | Pang et al. |
| 2008/0203170 A1 | 8/2008 | Hammad et al. |
| 2008/0222193 A1 | 9/2008 | Reid |
| 2008/0245851 A1* | 10/2008 | Kowalski ........... G06K 7/10178 235/375 |
| 2009/0037284 A1 | 2/2009 | Lewis et al. |
| 2009/0048953 A1 | 2/2009 | Hazel et al. |
| 2009/0070583 A1 | 3/2009 | von Mueller et al. |
| 2009/0083474 A1 | 3/2009 | Cooke |
| 2009/0099961 A1 | 4/2009 | Ogilvy |
| 2009/0112768 A1 | 4/2009 | Hammad et al. |
| 2009/0164326 A1 | 6/2009 | Bishop et al. |
| 2009/0217257 A1 | 8/2009 | Huang et al. |
| 2009/0279549 A1 | 11/2009 | Ramanathan et al. |
| 2010/0023777 A1 | 1/2010 | Prevost et al. |
| 2010/0057620 A1 | 3/2010 | Li et al. |
| 2010/0063893 A1 | 3/2010 | Townsend |
| 2010/0125546 A1 | 5/2010 | Barrett et al. |
| 2010/0136913 A1 | 6/2010 | Picquenot et al. |
| 2010/0159907 A1 | 6/2010 | Farley et al. |
| 2010/0233996 A1 | 9/2010 | Herz et al. |
| 2010/0243732 A1 | 9/2010 | Wallner |
| 2010/0257067 A1 | 10/2010 | Chan |
| 2010/0274712 A1 | 10/2010 | Mestre et al. |

(56) References Cited

U.S. PATENT DOCUMENTS

| | | |
|---|---|---|
| 2010/0287083 A1 | 11/2010 | Blythe |
| 2010/0306076 A1 | 12/2010 | Taveau et al. |
| 2010/0312692 A1 | 12/2010 | Teicher |
| 2011/0078081 A1 | 3/2011 | Pirzadeh et al. |
| 2011/0110234 A1 | 5/2011 | Pulijala et al. |
| 2011/0119680 A1 | 5/2011 | Li et al. |
| 2011/0155800 A1 | 6/2011 | Mastrangelo et al. |
| 2011/0173691 A1 | 7/2011 | Baba |
| 2011/0202415 A1 | 8/2011 | Casares et al. |
| 2012/0011062 A1 | 1/2012 | Baker et al. |
| 2012/0116887 A1 | 5/2012 | Norair |
| 2012/0117568 A1 | 5/2012 | Plotkin |
| 2012/0126012 A1 | 5/2012 | Lamba et al. |
| 2012/0130903 A1 | 5/2012 | Dorsey et al. |
| 2012/0132712 A1 | 5/2012 | Babu et al. |
| 2012/0135681 A1 | 5/2012 | Adams et al. |
| 2012/0143703 A1 | 6/2012 | Wall et al. |
| 2012/0166491 A1 | 6/2012 | Angus et al. |
| 2012/0193434 A1 | 8/2012 | Grigg et al. |
| 2012/0196531 A1 | 8/2012 | Posch et al. |
| 2012/0198434 A1 | 8/2012 | Dirstine et al. |
| 2012/0221466 A1 | 8/2012 | Look |
| 2012/0278795 A1 | 11/2012 | Bouchier et al. |
| 2013/0006847 A1 | 1/2013 | Hammad et al. |
| 2013/0040566 A1 | 2/2013 | Mourtel et al. |
| 2013/0125107 A1 | 5/2013 | Bandakka et al. |
| 2013/0204721 A1 | 8/2013 | Gazdzinski |
| 2013/0211929 A1 | 8/2013 | Itwaru |
| 2013/0229981 A1* | 9/2013 | Park ................ H04W 72/0406 370/328 |
| 2013/0254110 A1 | 9/2013 | Royyuru et al. |
| 2013/0268443 A1 | 10/2013 | Petrov et al. |
| 2013/0283256 A1 | 10/2013 | Proud |
| 2013/0290234 A1 | 10/2013 | Harris et al. |
| 2013/0290945 A1 | 10/2013 | Sawal et al. |
| 2013/0335199 A1 | 12/2013 | Jonely |
| 2013/0346302 A1 | 12/2013 | Purves et al. |
| 2014/0001263 A1 | 1/2014 | Babu et al. |
| 2014/0081849 A1 | 3/2014 | Varvarezis |
| 2014/0108263 A1 | 4/2014 | Ortiz et al. |
| 2014/0108704 A1 | 4/2014 | Boring |
| 2014/0109076 A1 | 4/2014 | Boone et al. |
| 2014/0136350 A1 | 5/2014 | Savolainen |
| 2014/0138435 A1 | 5/2014 | Khalid |
| 2014/0138436 A1 | 5/2014 | Mestre |
| 2014/0225713 A1 | 8/2014 | McIntyre et al. |
| 2014/0256254 A1 | 9/2014 | Sarda et al. |
| 2014/0263625 A1 | 9/2014 | Smets et al. |
| 2014/0289107 A1 | 9/2014 | Moshal |
| 2014/0297530 A1 | 10/2014 | Eckel et al. |
| 2014/0304094 A1 | 10/2014 | Reddy et al. |
| 2014/0317611 A1 | 10/2014 | Wojcik et al. |
| 2014/0365776 A1 | 12/2014 | Smets et al. |
| 2015/0039455 A1 | 2/2015 | Luciani |
| 2015/0046323 A1* | 2/2015 | Blythe ................ G07F 19/206 705/41 |
| 2015/0058145 A1 | 2/2015 | Luciani |
| 2015/0149353 A1 | 5/2015 | Linden et al. |
| 2015/0161594 A1 | 6/2015 | Jarman et al. |
| 2015/0178730 A1 | 6/2015 | Gleeson et al. |
| 2015/0278562 A1* | 10/2015 | Adrangi ............ G06K 7/10237 455/41.1 |
| 2015/0287031 A1 | 10/2015 | Radu et al. |
| 2015/0294299 A1 | 10/2015 | Maddocks et al. |
| 2015/0348009 A1 | 12/2015 | Brown et al. |
| 2015/0381203 A1 | 12/2015 | Master et al. |
| 2016/0007292 A1 | 1/2016 | Weng et al. |
| 2016/0117659 A1 | 4/2016 | Bedier et al. |
| 2016/0171482 A1 | 6/2016 | Muncey et al. |
| 2016/0183032 A1 | 6/2016 | Pogorelik et al. |
| 2016/0188896 A1 | 6/2016 | Zatko et al. |
| 2016/0188909 A1 | 6/2016 | Zatko et al. |
| 2016/0217465 A1 | 7/2016 | Gaur et al. |
| 2016/0226519 A1 | 8/2016 | Meng et al. |
| 2016/0275478 A1 | 9/2016 | Li et al. |
| 2016/0358159 A1 | 12/2016 | Khan et al. |
| 2017/0200177 A1 | 7/2017 | Psillas |
| 2017/0236125 A1 | 8/2017 | Guise et al. |
| 2017/0308882 A1 | 10/2017 | Bedier et al. |
| 2017/0364878 A1 | 12/2017 | Malhotra et al. |
| 2018/0005223 A1 | 1/2018 | Terra et al. |
| 2018/0005226 A1 | 1/2018 | Terra et al. |
| 2018/0005237 A1 | 1/2018 | Terra et al. |
| 2018/0012213 A1* | 1/2018 | Adelgren ................ G06F 21/45 |
| 2018/0096405 A1 | 4/2018 | Cho et al. |
| 2018/0150815 A1 | 5/2018 | Mocko et al. |
| 2018/0268390 A1 | 9/2018 | Nuzum et al. |
| 2018/0276602 A1* | 9/2018 | Rivalto ................ G07G 1/0036 |
| 2019/0114607 A1 | 4/2019 | Wadhwa et al. |
| 2020/0201985 A1 | 6/2020 | Cat et al. |
| 2020/0202347 A1 | 6/2020 | Cat et al. |

FOREIGN PATENT DOCUMENTS

| | | |
|---|---|---|
| CN | 108140182 A | 6/2018 |
| CN | 109690593 A | 4/2019 |
| DE | 20320080 U1 | 4/2004 |
| EP | 0 895 203 A2 | 2/1999 |
| EP | 1 408 459 A1 | 4/2004 |
| EP | 1 874 014 A2 | 1/2008 |
| FR | 2 812 744 A1 | 2/2002 |
| FR | 2 812 745 A1 | 2/2002 |
| FR | 2 834 156 A1 | 6/2003 |
| GB | 2468774 A | 9/2010 |
| GB | 2519798 A | 5/2015 |
| JP | H09231285 A | 9/1997 |
| JP | H11-110221 A | 4/1999 |
| JP | 2000-030146 A | 1/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-510412 A | 4/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-199405 A | 7/2004 |
| JP | 2004-258870 A | 9/2004 |
| JP | 2004-536405 A | 12/2004 |
| JP | 2006-018408 A | 1/2006 |
| JP | 2009-507308 A | 2/2009 |
| JP | 4248820 B2 | 4/2009 |
| JP | 2010-244248 A | 10/2010 |
| JP | 2015-510168 A | 4/2015 |
| JP | 2016-500182 A | 1/2016 |
| JP | 2016-081527 A | 5/2016 |
| JP | 6505948 B2 | 4/2019 |
| KR | 10-1999-0066397 A | 8/1999 |
| KR | 10-1999-0068618 A | 9/1999 |
| KR | 200225019 B1 | 3/2001 |
| KR | 10-2003-0005936 A | 1/2003 |
| KR | 10-2003-0005984 A | 1/2003 |
| KR | 10-2003-0012910 A | 2/2003 |
| KR | 2003-0086818 A | 11/2003 |
| KR | 200333809 B1 | 11/2003 |
| KR | 10-2004-0016548 A | 2/2004 |
| KR | 100447431 B1 | 8/2004 |
| KR | 200405877 B1 | 1/2006 |
| KR | 100649151 B1 | 11/2006 |
| KR | 10-2007-0107990 A | 11/2007 |
| KR | 100842484 B1 | 6/2008 |
| RU | 2284578 C1 | 9/2006 |
| WO | 1998/012674 A2 | 3/1998 |
| WO | 2000/011624 A1 | 3/2000 |
| WO | 2000/025277 A1 | 5/2000 |
| WO | 2001/086599 A2 | 11/2001 |
| WO | 2002/033669 A1 | 4/2002 |

(56) References Cited

FOREIGN PATENT DOCUMENTS

| | | | |
|---|---|---|---|
| WO | 2002/043020 A2 | 5/2002 |
| WO | 2002/082388 A1 | 10/2002 |
| WO | 2002/084548 A1 | 10/2002 |
| WO | 2003/044710 A1 | 5/2003 |
| WO | 2003/079259 A1 | 9/2003 |
| WO | 2004/023366 A1 | 3/2004 |
| WO | 2006/131708 A1 | 12/2006 |
| WO | 2009/119224 A1 | 10/2009 |
| WO | 2013074499 A1 | 5/2013 |
| WO | 2013/106723 A2 | 7/2013 |
| WO | 2013/126996 A1 | 9/2013 |
| WO | 2015/068904 A1 | 5/2015 |
| WO | 2017/053699 A1 | 3/2017 |
| WO | 2017/172953 A1 | 10/2017 |
| WO | 2018/005475 A1 | 1/2018 |
| WO | 2018/005717 A1 | 1/2018 |

OTHER PUBLICATIONS

Office Action for Japanese Patent Application No. 2018-549254, dated Nov. 11, 2019.
Notice of Allowance dated Nov. 13, 2019, for U.S. Appl. No. 16/153,649, of Steshenko, R., et al., filed Oct. 5, 2018.
Advisory Action dated Dec. 2, 2019, for U.S. Appl. No. 16/230,823, of Cat, M., et al., filed Dec. 21, 2018.
Examination Report No. 1 for Australian Patent Application No. 2017290567, dated Dec. 4, 2019.
"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.
"Guideline for the Use of Advanced Authentication Technology," FIPS 190, Sep. 28, 1994.
"Identification cards—Recording technique—Part 4—Location of read-only magnetic tracks—Track 1 and 2," ISO/IEC 7811-4:1995, International Organization for Standardization, Aug. 1995.
Jerome Svigals., "The Long Life and Imminent Death of the Mag-stripe Card," IEEE Spectrum, vol. 49, Issue 61, Jun. 2012.
"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing-rev1.pdf Apr. 14, 2008.
Martha E. Haykin et al., "Smart Card Technology: New Methods for Computer Access Control," NIST Special Publication 500-157, Sep. 1988.
Spegele, Joseph Brain., "A Framework for Evaluating Application of Smart Cards and Related Technology Within the Department of Defense," Naval Postgraduate School, Jan. 1995.
Stephen A. Sherman et al., "Secure Network Access Using Multiple Applications of AT&T's Smart Card," AT&T Technical Journal, Sep./Oct. 1994.
Notice of Allowance dated Jan. 7, 2016, for U.S. Appl. No. 14/863,381, of Vadera, K., filed Sep. 23, 2015.
Non-Final Office Action dated Jul. 29, 2016, for U.S. Appl. No. 15/052,790, of Vadera, K., filed Feb. 24, 2016.
Non-Final Office Action dated Nov. 16, 2016, for U.S. Appl. No. 15/197,708, of Terra, D., et al., filed Jun. 29, 2016.
Notice of Allowance dated Nov. 23, 2016, for U.S. Appl. No. 15/052,790, of Vadera, K., filed Feb. 24, 2016.
Non-Final Office Action dated Jan. 31, 2017, for U.S. Appl. No. 15/197,706, of Terra, D., et al., filed Jun. 29, 2016.
Notice of Allowance dated May 18, 2017, for U.S. Appl. No. 15/086,024, of Steshenko, R., et al., filed Mar. 30, 2016.
Notice of Allowance dated Jun. 2, 2017, for U.S. Appl. No. 15/197,708, of Terra, D., et al., filed Jun. 29, 2016.
Non-Final Office Action dated Jul. 19, 2017, for U.S. Appl. No. 15/086,025, of Steshenko, R., et al., filed Mar. 30, 2016.
Final Office Action dated Aug. 15, 2017, for U.S. Appl. No. 15/197,706, of Terra, D., et al., filed Jun. 29, 2016.
Advisory Action dated Nov. 30, 2017, for U.S. Appl. No. 15/197,706, of Terra, D., et al., filed Jun. 29, 2016.
Final Office Action dated Dec. 5, 2017, for U.S. Appl. No. 15/086,025, of Steshenko, R., et al., filed Mar. 30, 2016.
Non-Final Office Action dated May 16, 2018, for U.S. Appl. No. 14/863,675, of Bota, O.I., et al., filed Sep. 24, 2015.
Notice of Allowance dated May 23, 2018, for U.S. Appl. No. 15/052,792, of Vadera, K., filed Feb. 24, 2016.
Notice of Allowance dated Jun. 6, 2018, for U.S. Appl. No. 15/086,025, of Steshenko, R., et al., filed Mar. 30, 2016.
Non-Final Office Action dated Jun. 15, 2018, for U.S. Appl. No. 15/197,711, of Terra, D., et al., filed Jun. 29, 2016.
Notice of Allowance dated Nov. 9, 2018, for U.S. Appl. No. 14/863,675, of Bota, O.I., et al., filed Sep. 24, 2015.
Final Office Action dated Jan. 15, 2019, for U.S. Appl. No. 15/197,711, of Terra, D., et al., filed Jun. 29, 2016.
Examiner Requisition for Canadian Patent Application No. 2,997,776, dated Mar. 7, 2019.
Non-Final Office Action dated Mar. 18, 2019, for U.S. Appl. No. 15/197,707, of Terra, D., et al., filed Jun. 29, 2016.
International Search Report and Written Opinion for International Application No. PCT/US2016/053303, dated Dec. 7, 2016.
International Search Report and Written Opinion for International Application No. PCT/US2017/024802, dated Jun. 7, 2017.
International Search Report and Written Opinion for International Application No. PCT/US2017/039858, dated Sep. 8, 2017.
International Search Report and Written Opinion for International Application No. PCT/US2017/039480, dated Oct. 18, 2017.
Decision to Grant a Patent Japanese Application No. 2018512995 dated Mar. 12, 2019.
Notice of Allowance dated May 8, 2019, for U.S. Appl. No. 15/197,711, of Terra, D., et al., filed Jun. 29, 2016.
Non-Final Office Action dated May 9, 2019, for U.S. Appl. No. 16/230,823, of Cat, M., et al., filed Dec. 21, 2018.
Notice of Allowance dated Jun. 21, 2019, for U.S. Appl. No. 15/197,711, of Terra, D., et al., filed Jun. 29, 2016.
Final Office Action dated Sep. 18, 2019, for U.S. Appl. No. 16/230,823, of Cat, M., et al., filed Dec. 21, 2018.
Examination Report, for European Patent Application No. 17737677.9, dated Jun. 14, 2019.
Final Office Action dated Aug. 22, 2019, for U.S. Appl. No. 15/197,707, of Terra, D., et al., filed Jun. 29, 2016.
Notice of Allowance dated Jun. 11, 2020, for U.S. Appl. No. 15/197,706, of Terra D. et al., filed Jun. 29, 2016.
"Embedded FINancial transactional IC card READer," Retrieved from the URL: https://cordis.europa.eu/project/rcn/58338/factsheet/en, Jun. 11, 2019, 2 pages.
Wyatt J., et al., "Improving Power Consumption in NFC and HF RFID Card Detection Systems," EETimes, May 24, 2013, www.eetimes.com/improving-power-consumption-in-nfc-and-hf-rfid-card-detection-systems/# (Year: 2013).
Notice of Allowance dated Jan. 28, 2020, for U.S. Appl. No. 16/153,649, of Steshenko, R., et al., filed Oct. 5, 2018.
Notice of Allowance dated Feb. 13, 2020, for U.S. Appl. No. 16/230,823, of Cat, M., et al., filed Dec. 21, 2018.
Notice of Allowance dated Mar. 5, 2020 for U.S. Appl. No. 15/197,706, of Terra, D., et al., filed Jun. 29, 2015.
Notice of Allowance dated Mar. 11, 2020, for U.S. Appl. No. 16/153,649, of Steshenko, R., et al., filed Oct. 5, 2018.
Examination Report No. 1 for AU Application No. 2017290124 dated Feb. 20, 2020.
Notice of Reasons for Refusal for Japanese Patent Application No. 2018-566533 dated Feb. 21, 2020.
Decision to grant European Patent Application No. 16777868.7 dated Mar. 19, 2020.
Examination Report No. 1 for AU Application No. 2017245244 dated Apr. 22, 2020.
Intention to Grant received for EP Application No. 17737677.9, dated May 15, 2020.
Decision to Grant a Patent received for Japanese Patent Application No. 2018-549254, dated May 25, 2020.
Decision to Grant a Patent received for Japanese Patent Application No. 2018-566533, dated Jun. 5, 2020.

(56) References Cited

OTHER PUBLICATIONS

Non-Final Office Action dated Mar. 25, 2020, for U.S. Appl. No. 16/230,940, of Cat, M., et al., filed Dec. 21, 2018.
Notice of Allowance dated Apr. 22, 2020, for U.S. Appl. No. 16/230,823, of Cat, M., et al., filed Dec. 21, 2018.
Examination Report No. 2 for Australian Patent Application No. 2017290567, dated Jun. 30, 2020.
Corrected Notice of Allowability dated Jun. 25, 2020 for U.S. Appl. No. 15/197,706, of Terra, D., et al., filed Jun. 29, 2015.
Non-Final Office Action dated Jun. 29, 2020, for U.S. Appl. No. 15/197,707, of Terra, D., et al., filed Jun. 29, 2016.
Final Office Action dated Jul. 22, 2020, for U.S. Appl. No. 16/230,940, of Cat, M. et al., filed Dec. 21, 2018.
Advisory Action dated Sep. 30, 2020, for U.S. Appl. No. 16/230,940, of Cat, M., et al., filed Dec. 21, 2018.
Notice of Allowance dated Dec. 17, 2020, for U.S. Appl. No. 16/230,940, of Cat, M., et al., filed Dec. 21, 2018.

* cited by examiner

POINT OF SALE (POS) SYSTEMS AND METHODS WITH DYNAMIC KERNEL SELECTION

BACKGROUND

Consumers can interact with a merchant's payment reader to transact electronic payments in a variety of ways, for example, a payment card having a magnetic strip that is swiped in a magnetic reader of the payment reader, a payment device having a Europay/MasterCard/Visa (EMV) chip that is inserted into a corresponding EMV slot of the payment reader, and near field communication (NFC) enabled devices such as a smart phone or EMV card that is tapped at the payment reader and that transmits payment information over a secure wireless connection. The payment reader may receive payment information as well as information about a payment transaction from the payment device, and may communicate such payment information to a payment system for processing and/or authorization of the transaction. Payment readers capable of facilitating such transactions may take a variety of forms, including a stand-alone mobile device.

Mobile payment readers have existed on the market for several years. However, as functionalities related to payment processing increase in variety and complexity, that is, as a consumer's options for payment grow, the processing requirements for a payment reader may outgrow the capabilities of the existing hardware that is already in the market. In some cases, the hardware of an early (or earlier)-generation payment reader that is in use by merchants may be unable to meet the processing demands of more modern payment transactions. In other cases, payment readers that are in use by merchants may be unable to process modern payment transactions because the readers lack sufficient power resources, or are not updated with the required software. In still other cases, payment readers that are in use by merchants may be physically capable of processing a payment transaction but may, due to environmental or security conditions, be unable or unwilling to do so at the particular time or under the particular circumstances requested by a consumer.

Therefore, solutions are generally desired that more optimally utilize processing and/or power resources on a payment reader, prevent processing by obsolete, less efficient, or undesired software versions, and otherwise enhance data security during payment processing.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
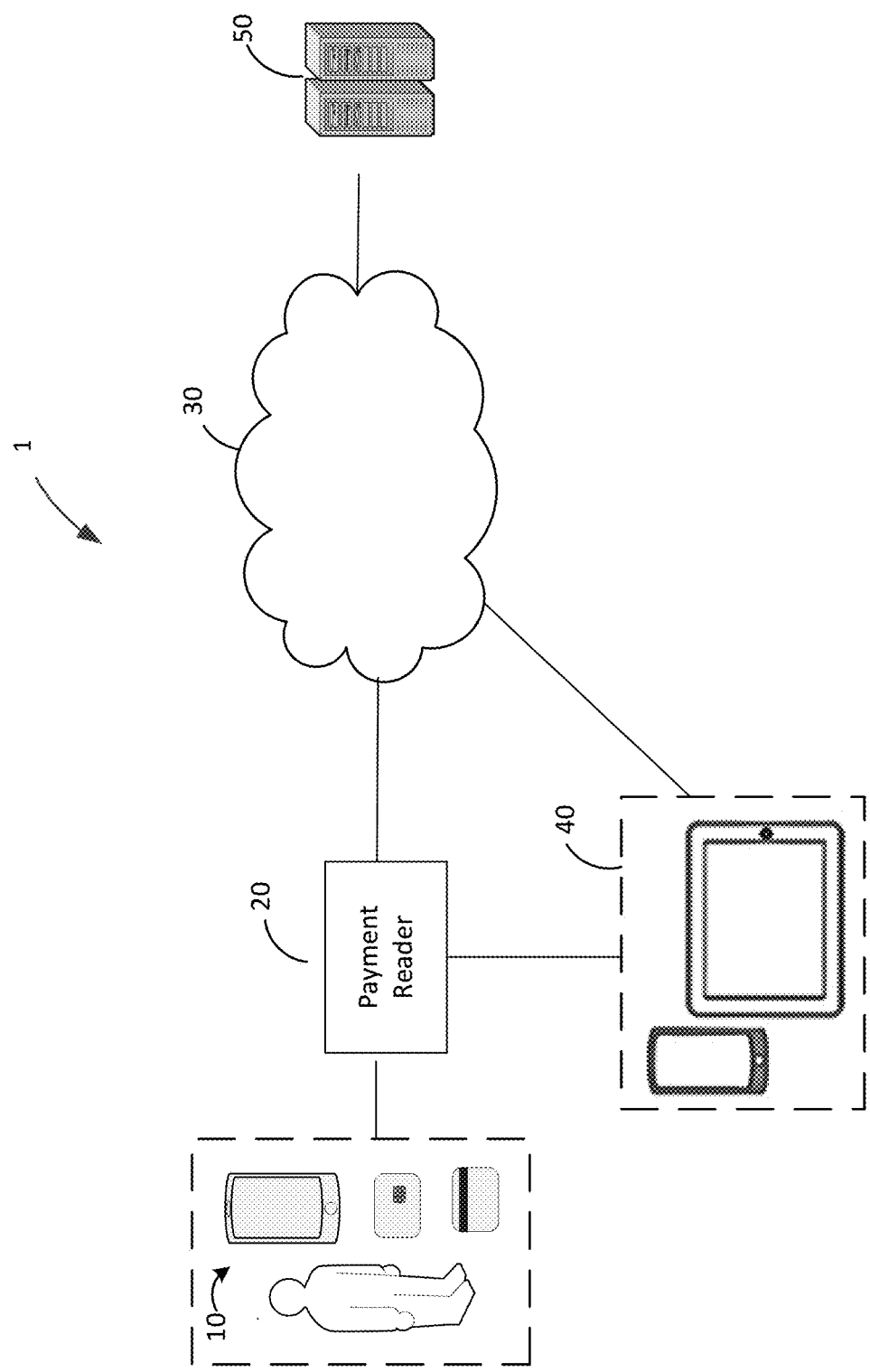
FIG. 1 depicts a block diagram of a payment system in accordance with some embodiments of the present disclosure.

A payment reader can be used to process payment information by acquiring payment information from a payment interface, encrypting the acquired payment information, and/or performing payment processing according to payment processing protocols for exchange of information with a payment server. A payment reader may have one or more processors that include dedicated kernels for payment processing, providing various functionalities relating to respective abstraction layers of the payment reader. For example, a module relating to functionalities of a first, physical layer may control interactions with devices capable of receiving information from a payment card, such as an NFC interface. A kernel relating to functionalities of a second, application layer may address other tasks, such as, e.g., the processing of a payment transaction, encryption within a secure payment enclave of the terminal, and/or transmission of the payment information to a payment server for approval, among others. Generally, a physical layer is referred to herein as a "first layer" or "L1." While an application layer may generally, in the context of the OSI model, be referred to as "Layer 7" or "L7," application layer components may also be referred to herein as a "second layer" or "L2" components, for ease of comparison with the term "L1." In this regard, it will be understood that in different embodiments, L1 and L2 may refer to different OSI layers than the physical layer and the application layer, and the concepts of the systems and methods described herein can be similarly applied thereto.

A payment reader may contain one or more processing units, which may provide different processing capabilities. For example, older models of a payment reader may have been designed to work with a first generation of kernel that is dependent on a first, limited set of hardware resources, whereas newer models of a payment reader may have been designed with a second generation of kernel that provides a suite of functions beyond those of the first generation kernel, but in turn requires a greater amount of memory and hardware resources than the first generation. For ease of reference, kernels providing a first, limited set of processing functionality are referred to herein as "Generation 1" or "GEN 1" kernels, whereas kernels providing a second, more robust set of processing functionality are referred to herein as "Generation 2" or "GEN 2" kernels.

In one embodiment, a merchant may be in possession of a payment reader with a GEN 1 kernel that is incapable of performing a function or handling information specific to the GEN 2 processor (i.e., a "GEN 2 function"). In a preferred embodiment, the payment reader contains a kernel controller (also referred to as a "kernel director") that recognizes that the payment reader may not have the hardware or software resources required to perform a GEN 2 function. In response to that recognition, the kernel director instead controls the payment reader to assign performance of that function to an external device such as a mobile device (e.g., a mobile phone or tablet) or a remote server that has the requisite GEN 2 kernel and resources. In a preferred embodiment, the kernel controller may be located in a processor, however, it may alternately be implemented as separate circuitry (or as any combination of hardware and software) in the payment reader. In yet another embodiment, the kernel controller may be implemented on a separate device to control functionality on the payment reader.

In another embodiment, a payment reader may have a GEN 2 kernel, but may nonetheless decide to direct processing of the GEN 2 function to a kernel of an external device because the payment reader is otherwise resource limited, for example, due to a need to conserve power at the reader. In another alternative embodiment, the payment reader may have a GEN 2 kernel, but may direct processing of the GEN 2 function to a GEN 2 kernel of an external device that is differently versioned than the GEN 2 kernel on the reader, for example, in a case where the particular GEN 2 function is more efficiently or preferably performed on the differently versioned software. In yet another embodiment, the payment reader may have a GEN 2 kernel, but may direct processing of the GEN 2 function to a kernel of the external device because the payment reader has recognized a security threat to the reader (e.g., a tampering attempt). For ease of reference, processing by a kernel that is not local to the payment reader (regardless of the location of the device doing the processing and/or whether the device is physically connected to the payment reader) may be referred to herein as processing "in the cloud."

In another embodiment, rather than offload the processing of the GEN 2 function to an external device, the processing is instead performed in an isolated secured area (such as a "trust zone") managed by a separate processor of the payment reader or of a device acting as an embedded card reader (ECR).

In another embodiment, a kernel may be modular in nature, where different GEN 1 and/or GEN 2 functionalities at the application layer may be separated into different logical "submodules" of the kernel. In this embodiment, different kernel functions can be performed at different respective devices based on the hardware resources of the payment reader, among other constraints.

FIG. 1 depicts an illustrative block diagram of a payment system 1 in accordance with an embodiment of the present disclosure. As illustrated, payment system 1 includes a payment device 10, a payment reader 20, a network 30, a mobile device (such as a mobile phone or iPad) or alternate computing device (such as a mobile device or PC) 40, and a payment server 50. In an exemplary embodiment, payment server 50 may include a plurality of servers operated by different entities, such as a payment service system or a bank server. The components of payment system 1 facilitate electronic payment transactions between a merchant and a customer.

The electronic interactions between the merchant and the customer take place between the customer's payment device 10 and the merchant's payment reader 20. In a preferred embodiment, the payment reader 20 may be a standalone mobile hardware device, though it is not so limited. For example, in other embodiments, the payment reader 20 may be a mobile device, such as a smart phone (iOS or Android) or another computing device that is configured to act as an embedded card reader (ECR). In one embodiment, payment device 10 may be a device that is capable of communicating with payment reader 20, such as a credit card having a magnetic strip, a credit card having an EMV chip, or a NFC-enabled electronic device such as a smart phone running a payment application. The chip card may include a secure integrated circuit that is capable of communicating with the payment reader 20, generating encrypted payment information, and providing the encrypted payment information as well as other payment or transaction information in accordance with one or more electronic payment standards such as those promulgated by EMVCo. The payment reader 20 is capable of executing a payment application (which may be, in some embodiments, a point-of-sale application or an application providing a portion of the functionality thereof) and includes at least one interface for receiving payment information from the payment device 10. The payment reader 20 can be capable of receiving and processing payment information through contact with the card or contactless interfaces and collecting payment information, including transaction information (e.g., purchase amount and point-of-purchase information) and card information (e.g., encrypted payment card data and user authentication data).

In some embodiments, the merchant may also have one or more mobile devices (or stationary computing devices) 40. These devices may in some embodiments provide additional functions, so as to, in correspondence with the payment reader's application, create, complete, supplement, or augment a comprehensive point-of-sale system implemented by the merchant. In some embodiments, one or more of the mobile devices 40 may provide a POS application wholly separate from the payment application executed on the payment reader 20. The devices 40 may be, for instance, a mobile phone such an iPhone or Android device, an iPad or tablet device, a laptop or touchscreen device, or a PC or stationary computing device, though any practical device that can communicate with the payment reader may be appropriate.

The payment reader 20, and/or, in some embodiments, any of the merchant devices 40, may communicate with payment server 50 over a communication network 30. Although communication network 30 may be any suitable communication network, in one embodiment, communication network 30 may be the Internet and payment and transaction information may be communicated between payment reader 20 and payment server 50 in an encrypted format such by a transport layer security (TLS) or secure socket layer (SSL) protocol. In addition, when the network 30 is the Internet, the payment reader 20 may use the transmission control protocol/Internet protocol (TCP/IP) for communication.

Although payment server 50 may be operated by a single entity, in one embodiment, payment server 50 may include any suitable number of servers operated by any suitable entities, such as a payment service system and one or more banks of the merchant and customer (e.g., a bank server) or a card issuer. The payment reader 20 and the payment server 50 communicate payment and transaction information to determine whether the transaction is authorized. For example, payment reader 20 may provide encrypted payment data, user authentication data, purchase amount information, and point-of-purchase information to payment server 50 over network 30. Payment server 50 may determine whether the transaction is authorized based on this received information as well as information relating to customer or merchant accounts, and respond to payment reader 20 over network 30 to indicate whether or not the payment transaction is authorized. Payment server 50 may also transmit additional information such as transaction identifiers to payment reader 20.

Based on the information that is received at payment reader 20 from payment server 50, the merchant may indicate to the customer whether the transaction has been approved. In some embodiments such as a chip card payment device, approval may be indicated at the payment reader 20, for example, at a screen of a payment reader 20.

In other embodiments such as a mobile phone or smart device operating as a NFC payment device, information about the approved transaction and additional information (e.g., receipts, special offers, coupons, or loyalty program information) may be provided to the NFC payment device for display at a screen of the smart phone or watch or stored in memory.

As previously mentioned, the payment reader 20, alone or together with the devices 40, can have a payment application that may provide for the entry of purchase and payment information, interaction with a customer, and communications with a payment server 50. For example, a payment application may provide a menu of services that a merchant is able to select and a series of menus or screens for automating a transaction. A payment application may also facilitate the entry of customer authentication information such as signatures, PIN numbers, or biometric information.

Figure 2A:
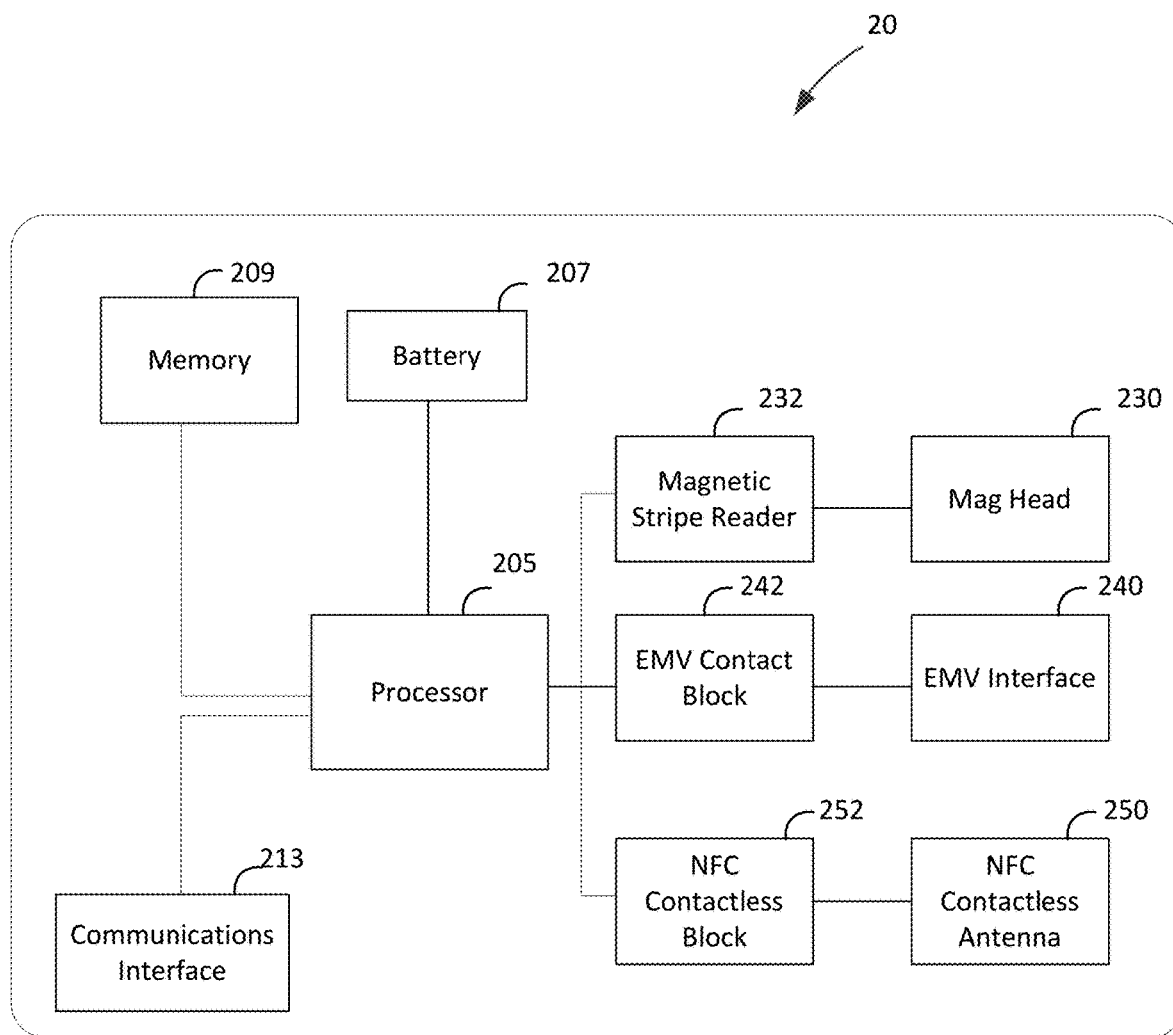
FIGS. 2A and 2B depict block diagrams of payment readers in accordance with some embodiments of the present disclosure.

FIG. 2A illustrates an example schematic diagram of components of an exemplary payment reader 20 in accordance with an embodiment. The device may include a multi-core processor 205 or equivalent. In some embodiments, payment reader 20 may have another type of suitable processor and may include hardware, software, memory, and circuitry (or any combination thereof) as is necessary to perform and control the functions of payment reader 20. In some embodiments, payment reader 20 may have multiple independent processing units, for example a multi-core processor or other similar component. In a preferred embodiment, the processor may have one or more dedicated kernels for performing different functions related to payment processing.

The processor may execute instructions stored in a memory 209 to control the operations of payment reader 20. As used herein, memory may refer to any suitable storage medium such as disks, thumb drives, etc., both volatile and non-volatile. Examples of such media include RAM, ROM, EPROM, EEPROM, SRAM, flash memory, disks or optical storage, magnetic storage, or any other tangible or non-transitory medium that stores information that is accessible by a processor.

The reader may include a communication interface 213, which may include one or more of a wireless communication interface and/or a wired communication interface. The reader 20 may also include a battery 207. As an alternate to a battery, one or more power supplies such as a physical connection to AC power or DC power (including power conversion circuitry) may be used. Battery 207 may be charged via a physical power connection, via inductive charging, or via any other suitable method. Although not depicted as physically connected to components of the payment reader other than the processor (described below), the battery may supply a variety of voltages to the components of the payment reader 20 in accordance with the requirements of those components.

A plurality of payment interfaces may be connected to corresponding ports or terminals on the processor 205. The processor 205 receives inputs from the Magnetic Stripe Reader (MSR) 232 which are read by a magnetic head reader 230. In some embodiments, the MSR device 230, 232 may include a slot that guides a customer to swipe or dip the magnetized strip of the card so as to collect payment information. The received payment information can then be provided to the processor 205 for processing. Inputs are also received from EMV contact 240 (chip card) and processed by an EMV contact block 242. The chip card may have contacts that engage and physically interface with corresponding contacts to contact pins of EMV interface 240. EMV interface 240 provides power and communications to an EMV chip of the chip card according to EMV specifications. This data may be processed by an EMV contact block 242 and provided to the processor 205.

Inputs from a contactless interface are received from an NFC contactless antenna 250 and processed by the NFC contactless block 252. The contactless antenna 250 is configured to receive input from EMV cards 20 and NFC (near field communication) cards, as well as other NFC devices, such as smart phones or other devices. In one embodiment, the antenna 250 can include circuitry for NFC communications such as electromagnetic compatibility (EMC) circuitry, matching circuitry, modulation circuitry, and measurement circuitry. Based on a signal provided by the processor 205, the antenna 250 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 20 is inductively coupled to a contactless payment device 10, the contactless payment device 10 may modulate the carrier signal via active or passive load modulation. By changing the tuning characteristics of the antenna of payment device 10, the wireless carrier signal is modified at both the payment device 10 and payment reader 20, resulting in a modulated wireless carrier signal. In this manner, the payment device 10 is capable of sending modulated data to payment reader 20, which data may be sensed by the antenna 250 and provided to the processor 205 for processing. In the preferred embodiment, the above-described contact and contactless interfaces can be combined into a single payment device that can provide all of the above functionalities.

Figure 2B:
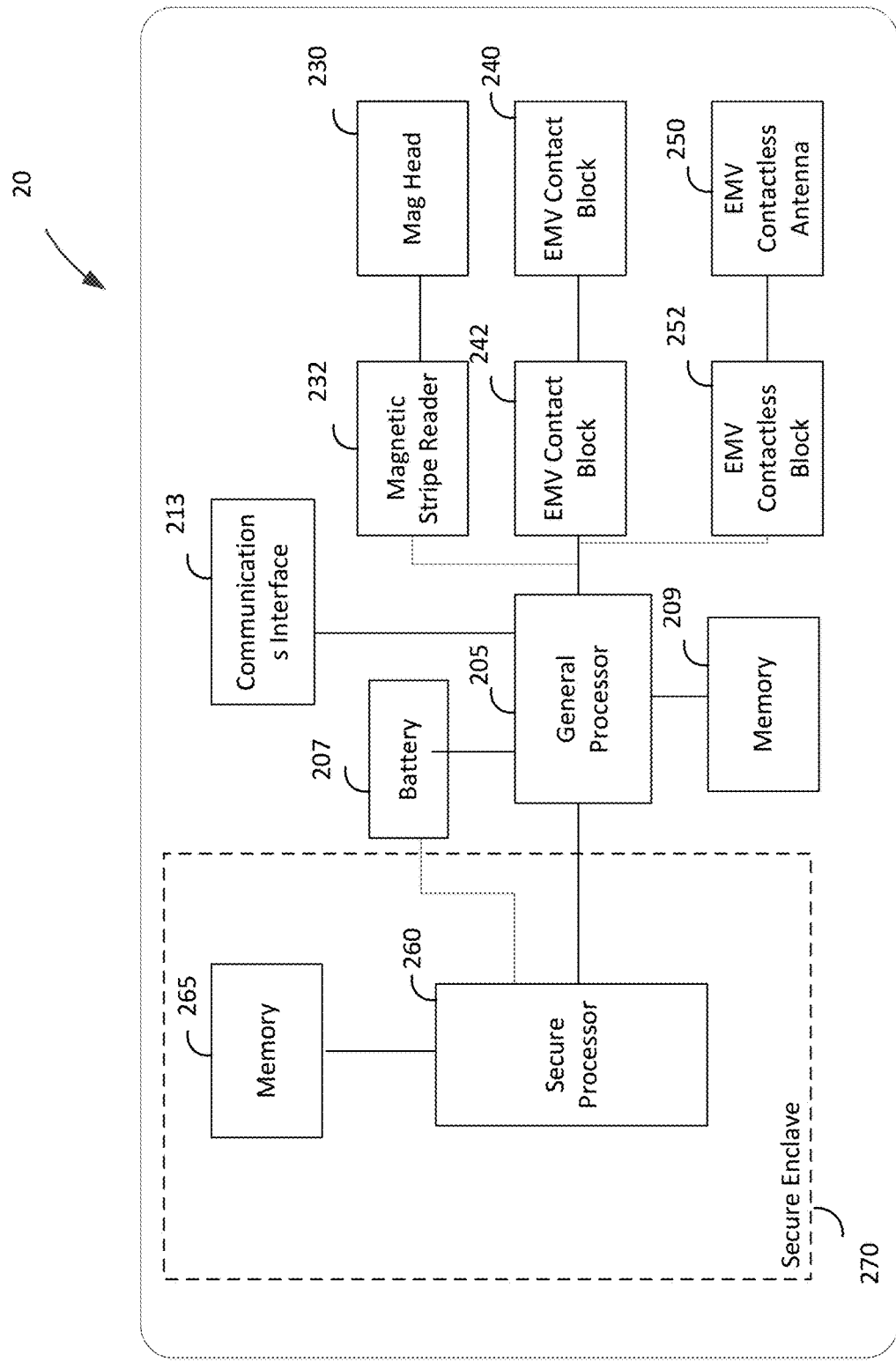

FIG. 2B illustrates an embodiment similar to that of FIG. 2A, where there are additional components, a secure processor 260 and memory 265 separate from the processor 205 and memory 209, that are located in a secure area or secure enclave 270 of the reader 20. The secure area can include hardware (e.g., processing units, memory), firmware, and/or software (e.g., applications) that is physically and logically isolated from the non-secure area. The secure area may be used for receiving, handling, and/or storing secure data that enters the payment reader, and for performing functions dependent on such secure data and components, such as encryption.

It will be understood that the architecture described above and illustrated in FIG. 2A and FIG. 2B is not limited to the components discussed herein, and may include other hardware and software components. Rather, for ease of illustration, only the components and functionalities most relevant to the subject inventions are discussed herein.

Figure 3A:
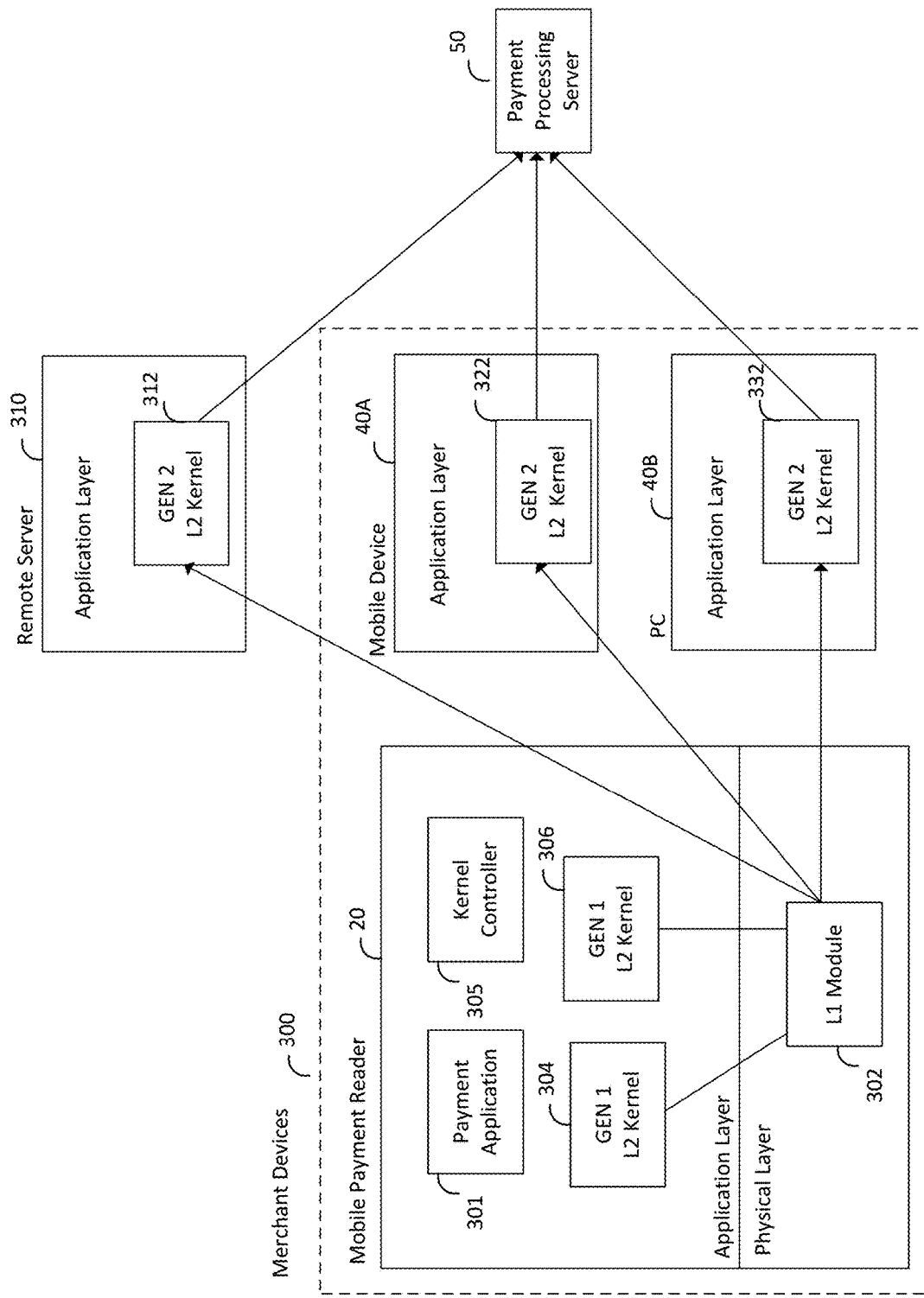
FIGS. 3A, 3B, 3C, and 3D depict block diagrams of various payment service systems in accordance with some embodiments of the present disclosure.

FIG. 3A illustrates an architecture wherein various kernels dedicated to payment processing functions are located in respective devices in the payment system. A merchant system 300 including a payment reader 20 is illustrated as being divided into a physical layer (L1) containing a module and an application layer (L2) with one or more $1^{st}$ generation (GEN 1) kernels each dedicated to different payment functions. In the preferred embodiment, the L1 module 302 may include hardware components that control the interactions with the interfaces (such as an NFC interface) capable of receiving information from a payment card, and transferring that information to other components of the payment reader. In some embodiments, the L1 module may be capable of performing other physical layer functions (e.g., error correction) relating to the information received from the payment card. In the embodiment of FIG. 3A, a plurality of L2

GEN 1 kernels 304, 306 are shown. In this embodiment, each of this plurality of GEN 1 kernels may correspond, for example, to a basic type of transaction for contactless payment processing. In this regard, each one of a plurality of GEN 1 L2 kernels may be dedicated, for example, to a respective one of MasterCard (MC), VISA, JCB, CUP, and other transaction types.

In the embodiment of FIG. 3A, payment reader 20 has limited hardware resources. For example, payment reader 20 may have older or outdated chip technology that is incapable of providing the processing power to perform certain payment processing functions. These additional functions that are out of reach of the GEN 1 kernels may be referred to herein as "GEN 2 functions," that is, functions with a processor requirement beyond the capabilities of the GEN 1 kernels but within the capabilities of GEN 2 kernels, such as, among other things, the collection of payment information from gift cards, loyalty cards, or other non-standard EMV payment devices. At the application layer, an L2 GEN 2 kernel may provide a variety of functions inaccessible to the GEN 1 kernel, such as encryption. To illustrate, the security of elliptic-curve cryptography (ECC) (applicable for, e.g., encryption, key agreement, digital signatures, and other tasks) is dependent upon the ability of a device to perform an intensive computation at a relatively fast speed. Such computation-heavy tasks may not be achievable within the constraints of outdated hardware, even if such hardware is otherwise still functional. Alternatively or additionally, the feature set available on an L2 kernel may be bigger (or different) than that of L1 module, the feature set available on a GEN 2 kernel as compared to GEN 1 being bigger still. Because of this, memory limitations may exist on dated devices, further limiting or prohibiting processing-intensive tasks.

FIG. 3A illustrates several devices external to the payment reader 20 that are capable of processing a GEN 2 transaction. In the illustrated example, each of mobile device 40A (which may include, for example, a mobile phone, such as iPhone or Android, an iPad or other tablet, a laptop or touch-screen computer, or any other suitable device), computing device 40B (which may be, for example, a personal computer), and remote server 310 have a GEN 2 L2 kernel. It will be understood that any number of external devices may be available for use, given the particular architectures of the merchant system and the payment system. Mobile device 40A and computing device 40B are both illustrated as part of merchant system (merchant devices 300), that is, the merchant in control of the payment reader 20 is also in control of the mobile device 40A and/or the computing device 40B, though they are not so limited. Therefore, in this embodiment, while devices 40A and 40B are external to the payment reader 20, they are not necessarily located in a remote geographic location.

Payment reader 20 may also include payment application or payment software 301. The payment application 301 may in some embodiments include features that make up all or a part of a point-of-sale (POS) application, or payment functionalities related thereto. When executed by the processor 205, the payment application 301 may, in some embodiments, provide a display with an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and/or perform any other suitable retail operations.

Further, at an appropriate time within the transaction process, the payment application 301 may send a message to one or more payment interfaces to permit the payment reader 20 to receive payment information from a payment device 10. In an alternate embodiment, the payment application 301 may be executed from a device external to the payment reader 20, such as the mobile device 40A (a smartphone), or any other practical implementation. Such implementation may be preferred, for example, where hardware resources on the reader 20 are limited. In yet another embodiment, some elements of the payment application 301 may run on the reader 20 (such as, e.g., the capability for user input) while other elements may be executed from a different device.

FIG. 3A also illustrates a payment processing server 50 that is a remote server capable of authorization of a payment. The payment server 50 may include a plurality of servers operated by different entities, such as a payment service system or a bank server. Each of mobile device 40A, computing device 40B, remote server 310, and payment reader 20 are variously capable of communication with the payment processing server 50.

In a first embodiment, the payment reader contains a kernel controller 305 that dynamically selects or determines the dedicated kernel to which particular transaction data should be directed for processing. The kernel controller 305 may be implemented in hardware and/or software or any combination thereof. In the illustrated embodiment, the kernel controller 305 is shown as a separate component, however, in another example, the kernel controller may be part of the payment application 301. In yet another example, the functions of the kernel controller may be otherwise performed by one or more components of the processor 205.

In the embodiment shown in FIG. 3A, the L1 module 302 controls the interaction with the payment interfaces 232, 242, 252 to receive payment information from the payment card 20. The kernel controller 305 of the payment reader 20 determines that the processing of the payment transaction requires a functionality that may be implemented by a GEN 2 kernel, but that may not be implemented by either of the L2 GEN 1 kernels 304 and 306. Because it has been determined that the reader does not have the hardware resources to perform the required GEN 2 function, the kernel controller 305 instead controls to assign performance of that function to a GEN 2 kernel external to the reader, such as those of mobile device 40A, PC 40B, or remote server 310 (regardless of whether or not the device doing the processing is external to the merchant system 300), any of which may have the requisite GEN 2 kernel and sufficient hardware resources.

In an alternate embodiment, it may be possible for contactless program software (e.g., NFC software) in a customer's mobile payment device 10 to itself initiate a call to a kernel or module in the payment reader 20. For example, using the NFC antenna, the NFC software in payment device 10 may call to the L1 module 302, to an application layer kernel 304 or 306, or to the kernel controller 305 which may determine which kernel to use and which may direct the NFC software to call to that selected kernel.

This distribution of different kernel functionalities locally and to resources in the cloud may be thought of as a "hybrid" distribution or assignment of kernels. For example, in the hybrid implementation illustrated in FIG. 3A, the GEN 1 functionalities required to process a payment are performed at the payment reader 20 (that is, locally), while the GEN 2 functionalities required to process the payment are performed by a GEN 2 kernel remote to the reader 20 (that is, in the cloud). For example, in one embodiment, the GEN 2 functionalities may be performed by a GEN 2 kernel on a mobile phone or iPad device. In a non-hybridized architecture, both GEN 1 and GEN 2 kernels would be located on the payment reader 20, or both would be located at a single location external to the reader 20 (e.g., a mobile device, computing device, or a remote server).

Figure 3B:
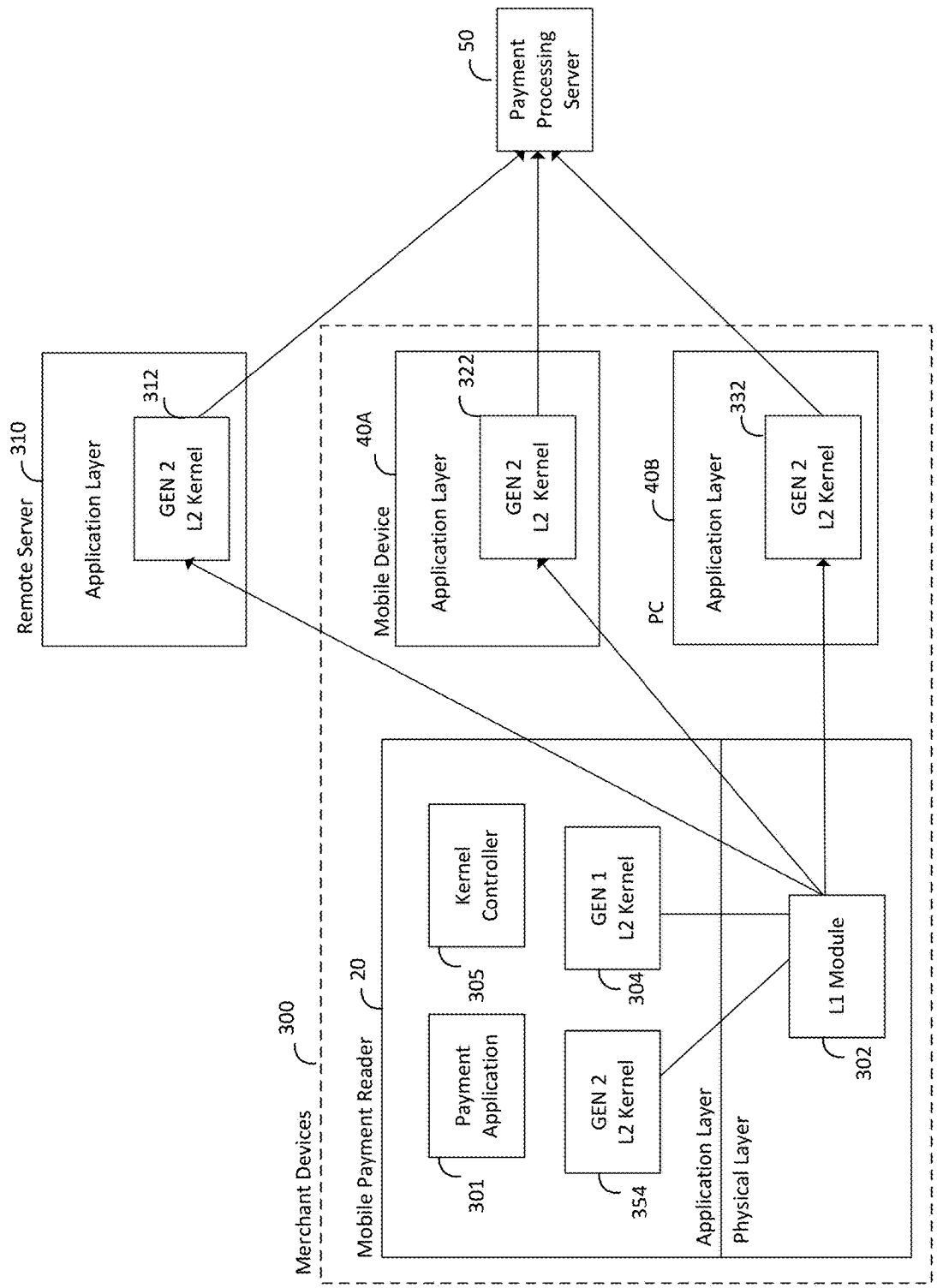

FIG. 3B illustrates an alternate embodiment where the payment reader 20 may contain both a GEN 1 kernel 304 and a GEN 2 kernel 354 at the application layer and an L1 module at the physical layer. In a case that the payment reader has a GEN 2 kernel, only one L2 GEN 2 kernel is needed for contactless payment, regardless of which transaction type (e.g., MC, VISA, etc.) is used. In another embodiment (not specifically illustrated), a second L2 GEN 2 kernel is dedicated to processing contact-based based payment (e.g., swipe or chip payment). In such embodiments, where the payment reader has the capability to perform GEN 2 functions, the reader 20 may nonetheless choose to offload GEN 2 processing to devices with identical (or similar) GEN 2 processors. Put another way, the system selectively chooses between duplicative copies of the GEN 2 kernel located at different installation points. This selection may be motivated by a variety of factors, not limited to constraints on hardware resources.

In one embodiment, the decision to offload processing of a GEN 2 function may be based on a determination that the payment reader, though having sufficient processor bandwidth, is otherwise resource limited. For example, the payment reader may need to conserve power, due to, e.g., low battery levels or excessive power consumption by other tasks such as card reading, computation, and communication. The determination to move processing to the cloud may be made, in one embodiment, based on a determination of a power level of the payment reader, by a kernel controller 305, which might otherwise direct processing to a GEN 1 or GEN 2 kernel local to the reader 20. In a preferred embodiment, the kernel controller may include a power measurement circuit or sensor (not specifically shown) that may be connected to processor 205, such sensor being capable of taking a dynamic measurement of the power level of the battery 207. Alternatively, the circuitry to take the measurement of battery level may be separate from the kernel controller and can communicate with the kernel controller. As one example, the kernel controller may, through one of these means, measure a current power level of the reader, as supplied by battery 107. If this current power level falls under a predetermined minimum threshold, the kernel controller may ignore the local kernels and instead direct processing of the function to a GEN 2 kernel installed on mobile device 40A (or any other appropriate external device). By these means, a low-power device may conserve energy, and there is no concern regarding failure to process based on limited power resources. In some embodiments, the predetermined threshold against with the battery level is measured may be a value stored in memory 209, and in others, the predetermined threshold may be a percentage value of the total battery capacity of the reader. In still other embodiments, one or more threshold values may be stored in a reference table or other data structure in the memory 209, in association with conditional events such as mechanical or environmental conditions of the reader, or a scheduled event, which may impact power consumption. In one such example, the kernel controller 305 may determine that the reader is scheduled to perform a task requiring high power consumption, and may refer to the reference table to identify a threshold power value associated with the scheduled event.

The current power level of the battery 207 is then compared to that threshold value to determine if the payment processing may be executed while still maintaining power for the scheduled task. In yet another embodiment, the table in the memory 209 may associate a threshold value with particular historical or predictive power usage conditions (such as an observed or predicted pattern of power consumption). In an exemplary embodiment, the kernel controller may take several iterative measurements of power level, and may observe a pattern in power consumption (e.g., a drainage rate over time). The kernel controller may then refer to the table in memory 209 to determine whether a particular threshold value is associated with such a pattern (such threshold being, for example, higher than a minimal threshold in order to account for a later drop in power). If the current power level is below that threshold value, the kernel controller directs processing of the GEN 2 information to a kernel on an external device. In general, it will be understood that the threshold to which a current power level is compared may be any measurable value to which the battery level may be compared.

Alternatively, the determination to offload processing from the reader may be based on a comparison of power levels between the payment reader and the device on which the target GEN 2 kernel is located (e.g., relative battery power), or any other measure of power consumption and/or constraint. In one such example, the kernel controller 305 may measure both a current power level of the reader 20 and a current power level of the mobile device 40A. Both of these values may then be compared to a predetermined threshold value (either to the same threshold value or to two respective threshold values). In a case where the measured power level of the reader values falls below a threshold and a measured power level of the mobile device 40A is above its threshold, the kernel controller may then (as described above) bypass processing on the kernels local to the reader and instead direct processing to a GEN 2 kernel installed on mobile device 40A. In another example, a difference in power levels between the payment reader and the mobile device 40A is calculated, and in a scenario where the power level of the mobile device is higher than that of the payment reader by a predetermined difference (i.e., the mobile device has power to spare), processing may be directed to the GEN 2 kernel installed on the mobile device 40A, even where the particular power level of the reader may not itself fall below a low-power threshold value.

In an alternative embodiment, a kernel controller 305 may dynamically determine to route processing of a function to a GEN 2 kernel on an external device where the GEN 2 kernel installed on the payment reader may be of a version that is not ideal to perform a particular GEN 2 functionality. That is, rather than the GEN 2 kernel located on the reader 20 and the GEN 2 kernels on the external devices 40A, 40B, 310 being duplicative copies, the various copies of the kernel may be differently versioned (in any permutation of versions) with respect to each other. The kernel controller may therefore determine to direct processing to a version of the kernel that is most appropriate (e.g., most efficient or otherwise preferred), based on a comparison of the version of the kernel software of the payment reader and that of the kernel software on the target cloud device.

In yet another embodiment, the kernel controller 305 may elect to offload processing because of a recognized security threat to the reader. As one example, the reader 20 (or an external security monitoring circuit (or software) or a human actor) may recognize that the reader has been tampered with, such as via an addition of an unauthorized third-party hardware component capable of reading card data or through alteration, manipulation, or breakage of any component of the reader 20. In a preferred embodiment, the kernel controller may dynamically reference a tamper detection circuit (not specifically shown) or other sensor to determine whether a tamper attempt was made. In other embodiments, the kernel controller may itself contain such circuitry, or such circuitry may be housed on an external device. The tamper detection circuit may, in one embodiment, be capable of measuring a resistance or capacitance value of the reader 20. It will be understood that the capacitance value may be measured based on the charge of any component part of the reader, of a particular (e.g., secure) portion of the reader, of the reader in total, or any other appropriate measurement. The capacitance measurement may then be compared to a known capacitance value, and if the difference between the two values exceeds a certain amount, the kernel controller may determine that a tampering attempt was made, In another example, a tampering attempt may be detected through a scan of the components of reader 20 to determine whether there are any discrepancies in the data stored in the memory 209, where there are unexpected or unknown applications present, or whether there are discrepancies in the physical and logical separation of the components in the secure and non-secure areas, among other things. By rerouting processing from the local kernel on the reader to the cloud, the system may in some circumstances, circumvent the compromised components of the reader.

Figure 3C:
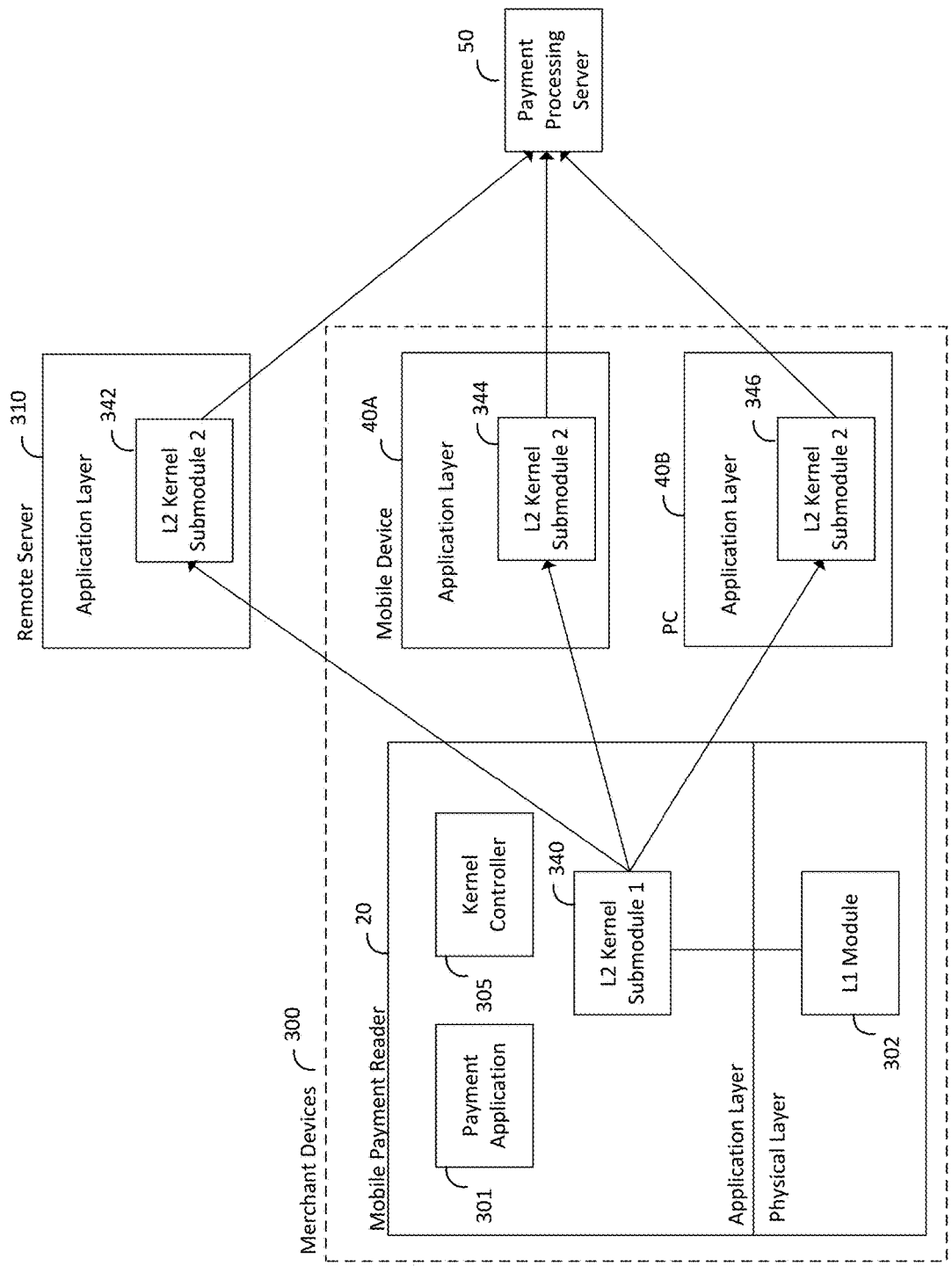

FIG. 3C illustrates an alternate embodiment where the payment reader 20 may contain a GEN 1 or GEN 2 L2 kernel that is modular in nature; that is, different GEN 1 and/or GEN 2 functionalities at the physical layer and/or application layer may be separated into different logical "submodules" of the L2 kernel. Put another way, rather than handling the entirety of the L2 kernel as a uniform or monolithic component that cannot be divided, its functionalities may be broken up into certain component parts. In this embodiment, different L2 kernel functions may be performed at different respective devices based on the hardware (or other) resources of the payment reader. In an exemplary embodiment, the submodules 1 and 2 of an L2 kernel of the reader 20 may be variously implemented on either the reader or on a device in the cloud. FIG. 3C depicts a mobile payment reader 20 with an L2 Kernel submodule 1 (a first submodule of the L2 kernel) 340. An L2 Kernel submodule 2 (a second submodule of the same L2 kernel) 342, 344, or 346 may be housed on an external device, such as any of mobile device 40A, PC 40B, or remote server 310. Submodule 340 and submodule 342, 344, 346 may be directed to different functions of the L2 Kernel. For example, in various embodiments, any one or more of submodules 340, 342, 344, and/or 346 may variously act to perform functions of a payment reader, such as the following: selection manager (e.g., a kernel controller that directs data for processing of different elements of the payment reader), pin handling, main kernel functions (e.g., core transactions), cryptography handler, payment authorization/approval/decline/referral, processing additional payment services, processing non-payment services that use cardholder information, configuration manager (e.g., handling configurations specific to countries, brands, payment transaction types, etc.), risk handling, points of interaction (e.g., cardholder/merchant displays or data entry through UI, keypads, or peripherals), receipt handling, proximity protocols, handling unauthorized transactions, timeouts, or cancellations, secure channel management, and communication between different modules or devices, among other functions. It will be understood that these are just general categories of functions that may in some instances be implemented in one or more submodules, and are not intended as an exhaustive list, or as a strict one-to-one correspondence between functions and discrete submodules. As one illustrated example, where the L2 kernel on the reader 20 includes a submodule relating to contactless payment processing, and a submodule directed to handling PIN/signature/biometric data, one these submodules may be executed on the reader 20, and one may be executed on a mobile device 40A. While the above-mentioned functions may be performed either on the reader itself or from an external device, functions related to a communication abstraction layer (that is, handling communication between the L1 layer of the payment reader and the remainder of the OSI layers) or certain low-level dialogue with a contact-based payment card must typically be located in the payment reader itself, as moving such functions elsewhere would be impractical or inefficient.

By distributing the locations of these submodules, processing of the various functions may be optimized in execution. In an exemplary scenario, a particular submodule designed to process highly-sensitive information may be offloaded to a cloud-based device with additional security features. In another exemplary scenario, one or more submodules may be processed from a cloud-based device where computing resources would otherwise not allow for the processing to be done on the reader in parallel, thereby completing processing in a more timely fashion. In another exemplary scenario, information required by the submodule may be stored in the cloud (that is, in a location remote and/or restricted from the reader 20) and processing may be delegated to a kernel submodule located on a device from which the required data can be more efficiently accessed.

Figure 3D:
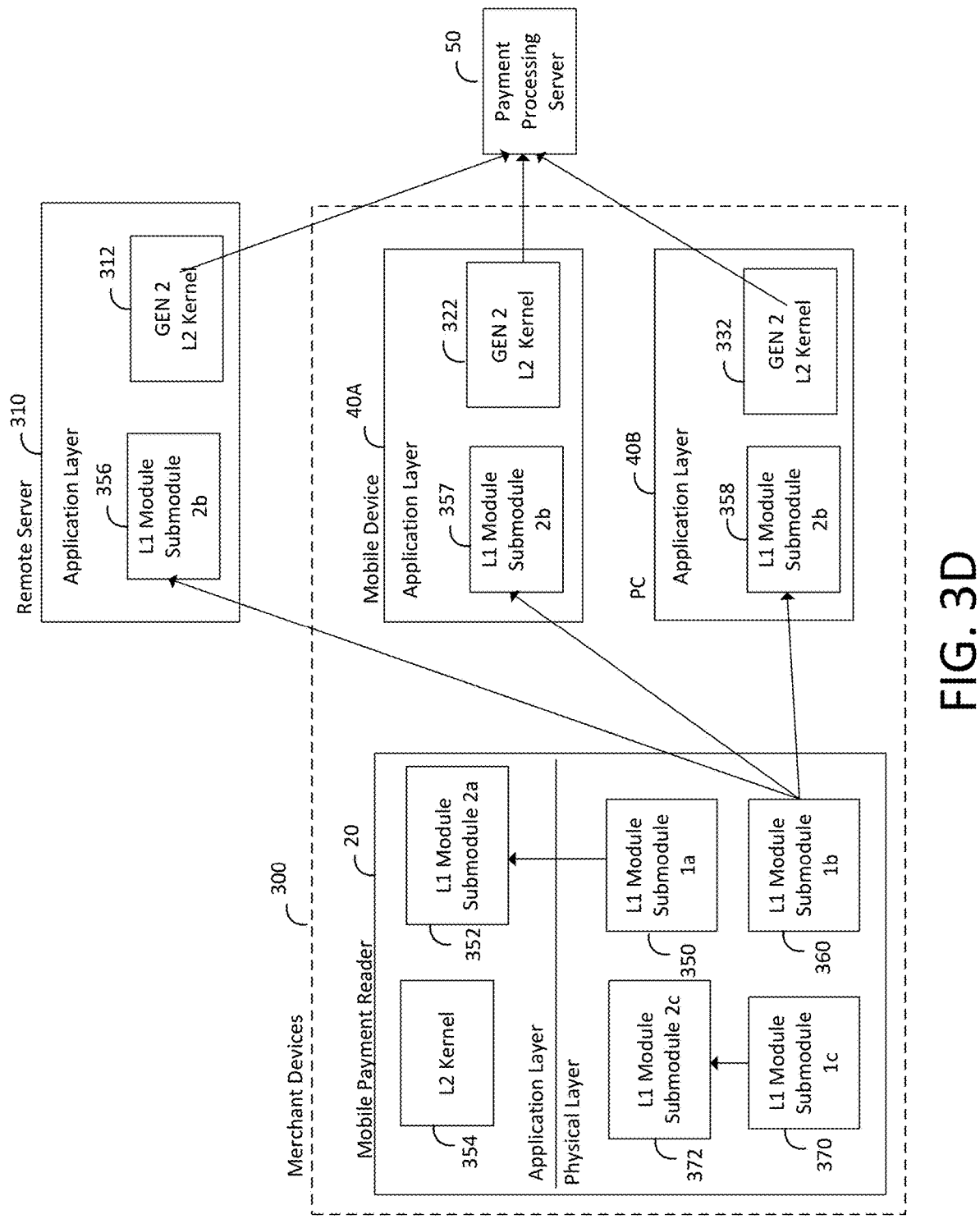

FIG. 3D illustrates alternate embodiments in which an L1 module has been divided into submodules, a submodule of the L1 module representing one or more of: mechanical characteristics of elements with which the payment card or NFC-enabled device interfaces, electrical (and, correspondingly, electromechanical) characteristics of the signals applied to and received from the payment card or NFC-enabled devices, and other characteristics required to operate a complete L1 module. In some embodiments, all submodules of an L1 module may be on the payment reader itself, as with L1 submodules 1c (element 370) and 2c (element 372) shown in FIG. 3D, which are housed on the payment reader 20. Alternatively, as illustrated in FIG. 3D, an L1 submodule may be divided between the physical layer and the application layer of the payment reader 20, with a submodule 1a (element 350) in the L1 layer of the reader while submodule 2a (element 352) is in the application layer of reader. In yet another alternate embodiment, submodule 1 b (element 360) may be located on the payment reader while submodule 2b (elements 356, 357, or 358) may be located on an external device, such as mobile device 40A, PC 40B, or remote server 310. Note that submodule 2b is a submodule of the L1 layer of the payment reader 20, not of the L1 layer of the external device on which the submodule is located, therefore, in the illustrated embodiment, the L1 submodule 2b will be processed at the application layer of the external device. In other embodiments, the L1 submodules may be distributed differently.

It will be understood that L1 submodules directed to mechanical characteristics of the reader (e.g., card contacts, electrical lines, active and/or passive circuits for processing signals, etc.) may in practicality be implemented only on the reader itself, as those functions are in general physically embedded in the reader. However, L1 submodules directed to other characteristics may alternatively be arranged so as to be located either on the reader or on a device external to the reader. Table 1 below, for example, lists some of the distributions of submodules that may be implemented in such embodiments.

TABLE 1

| | Payment Reader Submodules | External Device Submodules |
|---|---|---|
| 1 | Mechanical Submodules<br>Electrical Submodules<br>Software Submodules | |
| 2 | Mechanical Submodules<br>Software Submodules | Electrical Submodules |
| 3 | Mechanical Submodules<br>Electrical Submodules | Software Submodules |
| 4 | Mechanical Submodules | Electrical Submodules<br>Software Submodules |

As an example, in some implementations, only software modules/characteristics are arranged to be in-reader software or on an external device such as a mobile phone (L1 submodules 2a or 2b respectively). In these implementations, discrete software components executed on the reader or on the external device drive electrical and mechanical components/characteristics that, for example, adjust voltage or test for card contact (L1 submodules 1a and 1b). As another example, row 4 of Table 1 references an implementation where both the electrical and the software submodules are arranged on the mobile phone (e.g., L1 submodule 2b 356, 357, or 358) or in the application layer of the reader (L1 submodule 2a). In this alternate implementation, software components executed on the kernel of an external device may drive electrical properties of the reader 20 (e.g., via audio/lightning jack, etc.), for example to adjust voltage or drive copper wire to EMV contact pads or NFC coil (antenna) on the payment reader 20 (in e.g., L1 submodule 1a or 1b). As one example, a Software Defined Radio application or an equivalent on one of mobile device 40A, PC 40B, or remote server 310 (L1 submodule 2b) is used to control an NFC coil maintained on the payment reader 20 (L1 submodule 1b). Similarly, software in the application layer of the payment reader (L1 submodule 2a) may be used to control mechanical components in the physical layer (L1 submodule 1a).

It will be understood that the architectures described above and illustrated in FIGS. 3A-3D are not limited to the components discussed herein, and may include other hardware and software components. Rather, for ease of illustration, only the components and functionalities most relevant to the subject inventions are discussed herein.

Figure 4:
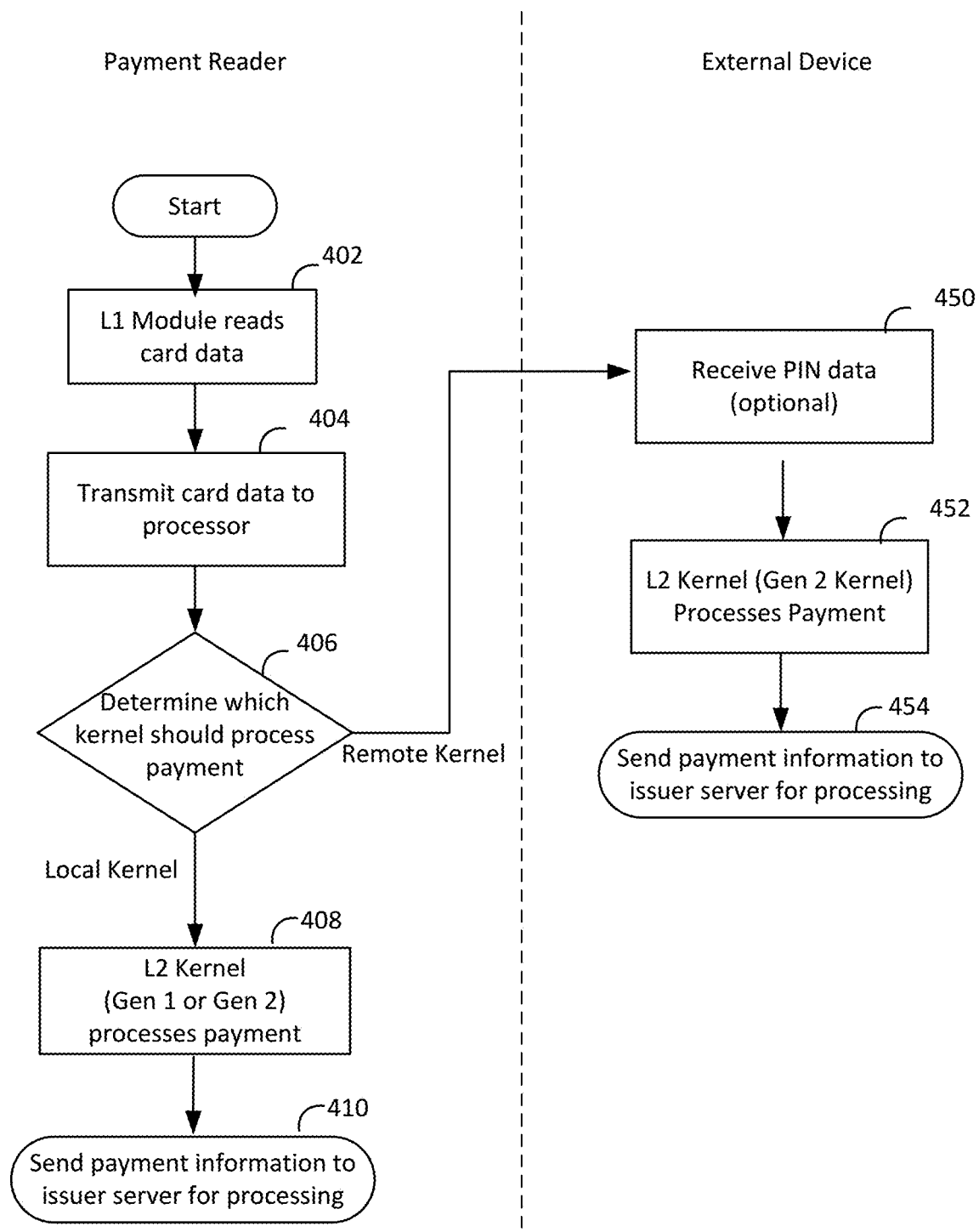
FIG. 4 depicts a flow chart illustrating exemplary steps for payment processing in accordance with some embodiments of the present disclosure.

FIG. 4 illustrates an example diagram of a flow of data between the components of the reader 20 and a mobile device 40A in accordance with an embodiment. In the example of FIG. 4, an architecture along the lines of the one shown in FIG. 3B may be used as an exemplary model. The process begins at Step 402, wherein the L1 Module of the reader 20 reads card data, for example in an NFC transaction via the contactless antenna 250. The card data is transmitted, in step 404, to the processor 205 (or to the secure processor 260 as appropriate). At step 406, a kernel controller 305 determines which kernel should process the payment transaction.

In a first scenario, the processing needs, and payment information, of the transaction are limited to the features of a GEN 1 application layer kernel. In this first scenario, the kernel controller, in step 408, directs processing to the L2 GEN 1 kernel 304 local to the payment reader 20. This processing may involve a variety of steps, including, e.g., the entry of authentication data such as a signature, PIN, or biometric data. After processing, the kernel 304 sends the processed payment information, via the communications interface 213, to a payment processing server 50, e.g., an issuer server, for authentication. In an alternate embodiment, where the reader may not have the memory or processing capacity for communication with the payment processing server, the processed payment data may be sent to the mobile device 40A or computing device 40B, via the communications interface 213, which device in turn forwards the data to the payment processing server 50.

In a second scenario, the processing needs of the transaction can only be met by a GEN 2 application layer kernel, and the payment reader 20 has a GEN 2 kernel and has the available resources to process the transaction. In this scenario, the kernel controller 305, in step 408, directs processing to the L2 GEN 2 kernel 354 local to the payment reader 20. This processing may involve a variety of steps, including, e.g., transactions based on a gift card of non-standard form of payment like payment through an application on a smart phone, and/or encryption of the card and payment data. This processing may also involve the entry of, e.g., authentication data. After processing, the kernel 354 sends the processed payment information, via the communications interface 213, to a payment processing server 50 in step 410, or alternatively, to the mobile device 40A or computing device 40B, which in turn forwards the data to the payment processing server 50.

In a third scenario, the processing needs of the transaction can only be met by a GEN 2 application layer kernel, however, the payment reader 20 does not have a GEN 2 kernel and/or does not have the available resources to process the transaction. In this scenario, the kernel controller 305, in step 406, directs processing to any of the L2 GEN 2 kernels 312, 322, or 332 on remote server 310, mobile device 40A, or computing device 40B respectively, each of which is external to the reader, by sending the payment data via the communications interface 213. The kernel on the selected external device then processes the transaction. This processing may involve a variety of steps, including, e.g., transactions based on a gift card of non-standard form of payment, e.g., payment through an application on a smart phone, and/or encryption of the card and transaction data. This processing may also require the entry of, e.g., authentication data, and in such a case, the kernel 312, 322, 332 receives such data in step 450 prior to processing the transaction in step 452. After processing, the external device transmits the data (which may include the transmission of the PIN, signature, or biometric data, among other information) to the payment processing server 50 in step 454.

By means of the methods and systems described above, even payment readers that are limited in hardware resources, in memory, in power, or are otherwise constrained in their ability to process payment transactions, may function to facilitate processing of a wide variety of payment transactions. Through this, merchants can provide new life to their existing, already deployed payment systems, without the need for extensive investment into new computing resources and/or payment readers. In addition, the security and efficiency of existing payment processing solutions can be improved (e.g., by providing more robust encryption solutions) by creating hybrid processing systems using cloud-based resources. As a result, improvements to the computing systems are put into effect even where dated hardware or other factors may not allow for improvement at the level of a payment reader itself.

Figure 5A:
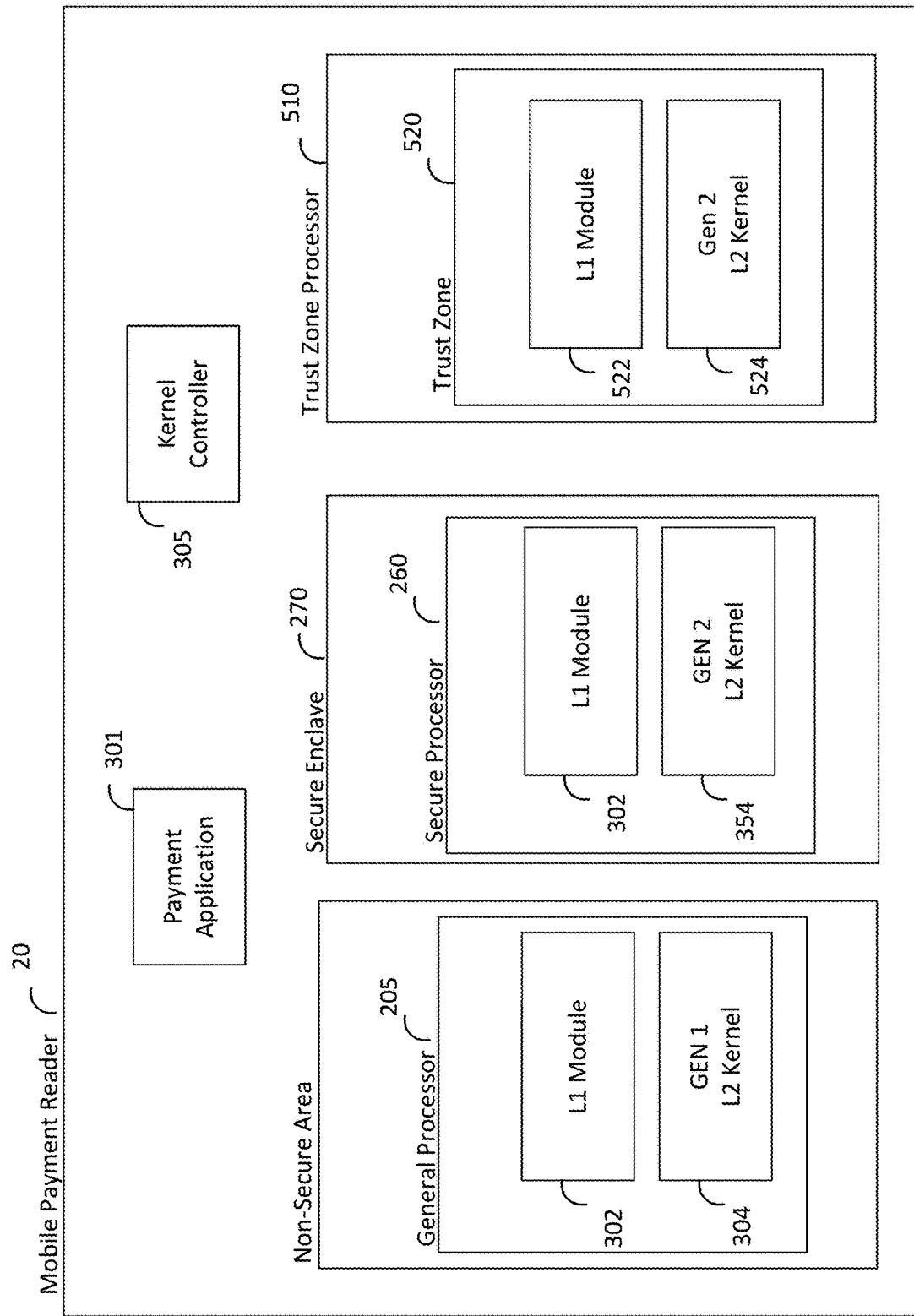
FIGS. 5A and 5B depict block diagrams of payment service systems in accordance with some embodiments of the present disclosure.

In another embodiment, with reference to FIG. 5A, an additional processor that manages a secure area separate from the secure enclave 270 can be provided in the reader 20 in an area physically and logically isolated from other processing components in the non-secure (or relatively non-secure) area and the secure enclave 270. This additional secure area is referred to herein as a "trust zone" or "trusted zone" 520. The resources of a trust zone processor 510 manage the trust zone 520, that is, the security of the trust zone is managed on the chip itself. In some embodiments, the trust zone processor 510 may maintain a bit value that designates whether the payment reader should be in a "trusted" or "normal" state, though other embodiments are possible. The components of the reader 20 and any data buses would be informed of the bit-value, thereby allowing the processor 510 to isolate and control access to the trust zone. As one example, the trust zone 520 can be implemented with TrustZone® technology from ARM Ltd, however, other technologies may be used. The trust zone may include corresponding hardware (e.g., separate processing units, memory), firmware, and software (e.g., applications).

In one exemplary embodiment, the kernel controller 305 may dynamically determine to redirect processing of a GEN 2 function to a separate GEN 2 kernel 354 located in the isolated trust zone 520 of the payment reader 20. The kernel controller 305 may make such a determination based on a detected event such as a tamper event. That is, upon detection of a tamper attempt, the kernel controller 305 may reroute processing of a GEN 2 function (which may otherwise be performed by GEN 2 kernel 354 in the secure enclave 270, to instead be executed by the GEN 2 kernel 524 in the trust zone 520. In another implementation, the trust zone may be associated with a dedicated Android processer (e.g., chip) running on the payment reader, that is, the trust zone is implemented by the Android OS, which may have additional security features directed to, for example, tamper-related functionality.

Figure 5B:
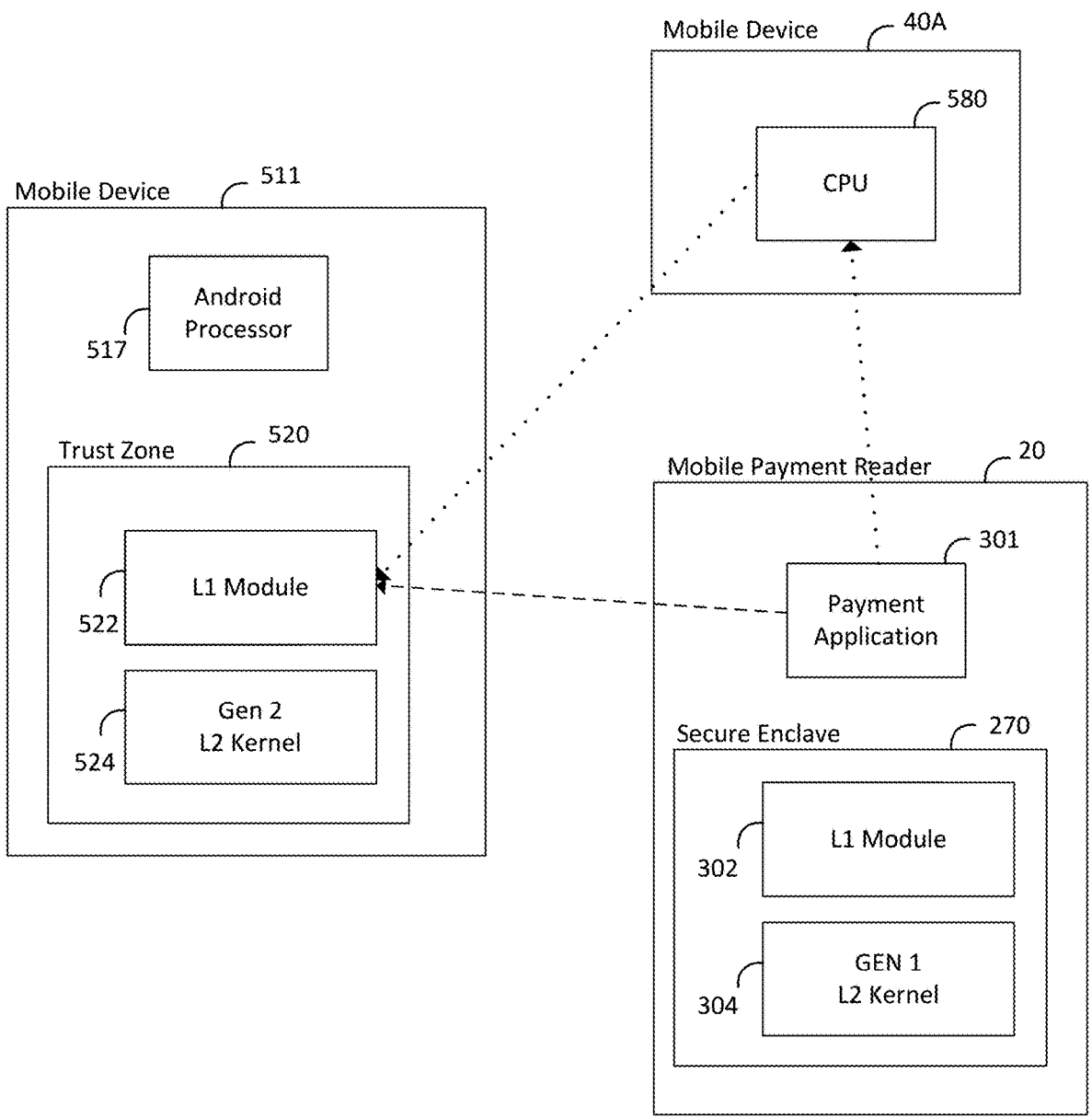

In another exemplary architecture, the payment system 1 additionally includes a mobile device 511, such as an Android smart phone, that is configured to act as an ECR. In the exemplary embodiment illustrated in FIG. 5B, a device 511 is an mobile device with an Android processor 517 for processing various functions of the Android OS and for managing a trust zone 520 with an L1 module 522 and L2 kernel 524, dedicated to processing payment transactions. In a scenario where the security needs of a GEN 2 process may not be met by the GEN 2 kernel on the reader 20 (for example, a tamper attempt on the reader is detected) or the reader 20 does not have available resources to process a security-intensive transaction, the kernel controller 305 may send the GEN 2 data to be processed by the GEN 2 kernel 524 in the isolated trust zone 520 of the ECR 511 (as shown in FIG. 5B by a dashed line). In a different embodiment, the kernel controller 305 may send the GEN 2 data to a mobile device 40A, which in turn determines that the data should be processed in a trust zone and sends the data to the GEN 2 kernel 524 in the trust zone 520 (as shown in FIG. 5B by the dotted lines). In yet another alternative architecture (not specifically shown), the ECR 511 (on, e.g., an Android phone) takes the place of the payment reader 20, rather than a standalone payment reader 20, and the ECR processes GEN 2 payment information locally by the appropriate kernel in its trust zone.

The use of trust zones may have several benefits over an otherwise hybrid system with a secure enclave. Initially, a trust zone is implemented in the preferred embodiment through code that runs natively, allowing the code to directly access hardware peripherals. A trust zone implementation may therefore be more efficient, and may be processed faster, than a solution with code implemented on, e.g., a Java layer or main processor that must access operating system/compatibility layers or that may require additional Java compiles to perform the same action. Further, because the concept of a trust zone is commonly implemented in ARM-based architectures (e.g., on some Android phones), no separate secured chip is needed, thereby reducing manufacturing costs. What is more, because trust zones are commonly implemented in some public CPU architectures, their security is well-tested, leading to a potentially more secure system with a greater set of built-in defenses.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A point of sale (POS) system comprising:
    a payment reader having:
        (a) one or more processors configured to identify a first plurality of data processing functions and a second plurality of data processing functions that does not overlap with the first plurality of data processing functions,
        (b) a physical layer module and corresponding circuitry for receiving payment information from a payment device either by physically interfacing with the payment device or by communicating with the payment device via a near field communication (NFC) interface, wherein the physical layer module is dedicated to controlling interactions between a payment object and one or more components of the payment reader configured to receive information from the payment device,
        (c) a payment application, and
        (d) a first module of an application layer kernel, the first module being configured, based on instructions received from the one or more processors, so as to be dedicated to processing payment information via any of the first plurality of data processing functions; and
    an apparatus external to the payment reader, the apparatus having a second module of the application layer kernel, the second module being configured so as to be dedicated to processing payment information via any of the second plurality of data processing functions,
    wherein the payment application is configured to, in a case it is determined that the received payment information should be processed via any of the first plurality of data processing functions, transmit the payment information to the first module of the application layer kernel of the payment reader for processing, and in a case it is determined that the received payment information should be processed via any of the second plurality of data processing functions, transmit the payment information to the second module of the application layer kernel on the apparatus for processing.

2. The POS system of claim 1, wherein the apparatus is configured to transmit the payment information to one or more payment servers after the payment information has been processed by the second module of the application layer kernel.

3. The POS system of claim 1, wherein the processing by the second module of the application layer kernel is related to authentication of a payment transaction.

4. The POS system of claim 1, wherein the payment information comprises first payment information and second payment information,
wherein the first module of the application layer kernel of the payment reader is configured to process the first payment information and the second module of the application layer kernel is configured to process the second payment information.

5. A point of sale (POS) system comprising:
a payment device having a payment application, an application layer kernel, and a first submodule of a physical layer module, wherein the physical layer module is dedicated to controlling interactions with components of the POS system configured to receive information from a payment object, wherein the first submodule of the physical layer module is configured to receive payment information from the payment object, wherein the payment application is configured to provide the payment information from the first submodule of the physical layer module to the application layer kernel for processing of the payment information by the application layer kernel, and wherein the application layer kernel is dedicated to processing payment information via any of a first plurality of payment processing functions; and
a payment reader coupled to the payment device and having a second submodule of the physical layer module comprising a physical interface configured to read payment information from the payment object,
wherein the payment reader is configured to transmit the payment information read from the payment object to the first submodule of the physical layer module.

6. The POS system of claim 5, wherein the payment device is a mobile phone external to the payment reader, and
wherein the payment reader is communicatively coupled to the mobile phone.

7. The POS system of claim 5, wherein the second submodule of the physical layer module relates to an electromechanical function of the payment reader.

8. The POS system of claim 7, wherein the electromechanical function of the payment reader relates to one or more of: adjustment of voltage levels of the payment reader and implementing contact with the payment object.

9. The POS system of claim 5, wherein the first submodule of the physical layer module relates to control of a software function of the payment reader.

10. The POS system of claim 5, wherein the first submodule of the physical layer module relates to control of an electrical function of the payment reader.

11. The POS system of claim 10, wherein the electrical function of the payment reader relates to driving an electrical connection between a wire and a payment interface of the payment reader, and
wherein the payment interface is one or more of: an EMV contact pad or an NFC coil.

12. A payment device comprising:
an interface configured to receive payment information from a payment object, the interface being part of a physical layer module dedicated to controlling interactions with components of the payment device configured to receive information from the payment object;
a payment application;
a first application layer module of a kernel dedicated to processing payment information via any of a first plurality of payment processing functions; and
a wireless communication interface capable of communication with an apparatus other than the payment device, the apparatus comprising a second application layer module of the kernel dedicated to processing payment information via any of a second plurality of payment processing functions that does not overlap with the first plurality of payment processing functions,
wherein the payment application is configured to provide the received payment information to the apparatus, via the wireless communication interface, for processing by the second application layer module.

13. The payment device of claim 12, wherein the payment application is further configured to:
receive, via the wireless communication interface, processed payment information from the apparatus, the processed payment information having been processed by the second application layer module, and
transmit the processed payment information to one or more payment servers.

14. The payment device of claim 13, wherein the payment application is further configured to transmit the processed payment information to the first application layer module of the kernel to be processed, prior to transmitting the processed payment information to the one or more payment servers.

15. The payment device of claim 12, wherein the first application layer module processes first payment information of the received payment information and the second application layer module processes second payment information of the received payment information, and
wherein the processing of the first payment information by the first application layer module and the processing of the second payment information by the second application layer module is done in parallel.

16. A method comprising:
receiving, by a payment device, payment information from a payment object;
transmitting, by the payment device, the payment information to a first application layer module of a first kernel for processing of the payment information by the first application layer module, the first application layer module being installed on the payment device and the first kernel being dedicated to processing payment information via any of a first plurality of payment processing functions; and
transmitting, by the payment device, the payment information processed by the first application layer module to a second application layer module of a second kernel for processing by the second application layer module, the second application layer module being installed on an apparatus external to the payment device and the second kernel being dedicated to processing payment information via any of a second plurality of payment processing functions that does not overlap with the first plurality of payment processing functions.

17. The POS system of claim 1, wherein the application layer kernel is a Layer 2 (L2) kernel conforming to a Europay/MasterCard/Visa (EMV) specification and/or one or more other electronic payment standards.

18. The POS system of claim 1, wherein the physical layer module is a dedicated module for performing payment processing functions at a first abstraction layer L1 of the POS system and the application layer kernel is a dedicated kernel for performing payment processing functions at a second abstraction layer L2 of the POS system.

* * * * *